March 24, 1925. 1,531,018
E. J. NEWTON ET AL
TAPE HANDLE APPLYING MACHINE
Filed April 8, 1922 14 Sheets-Sheet 1
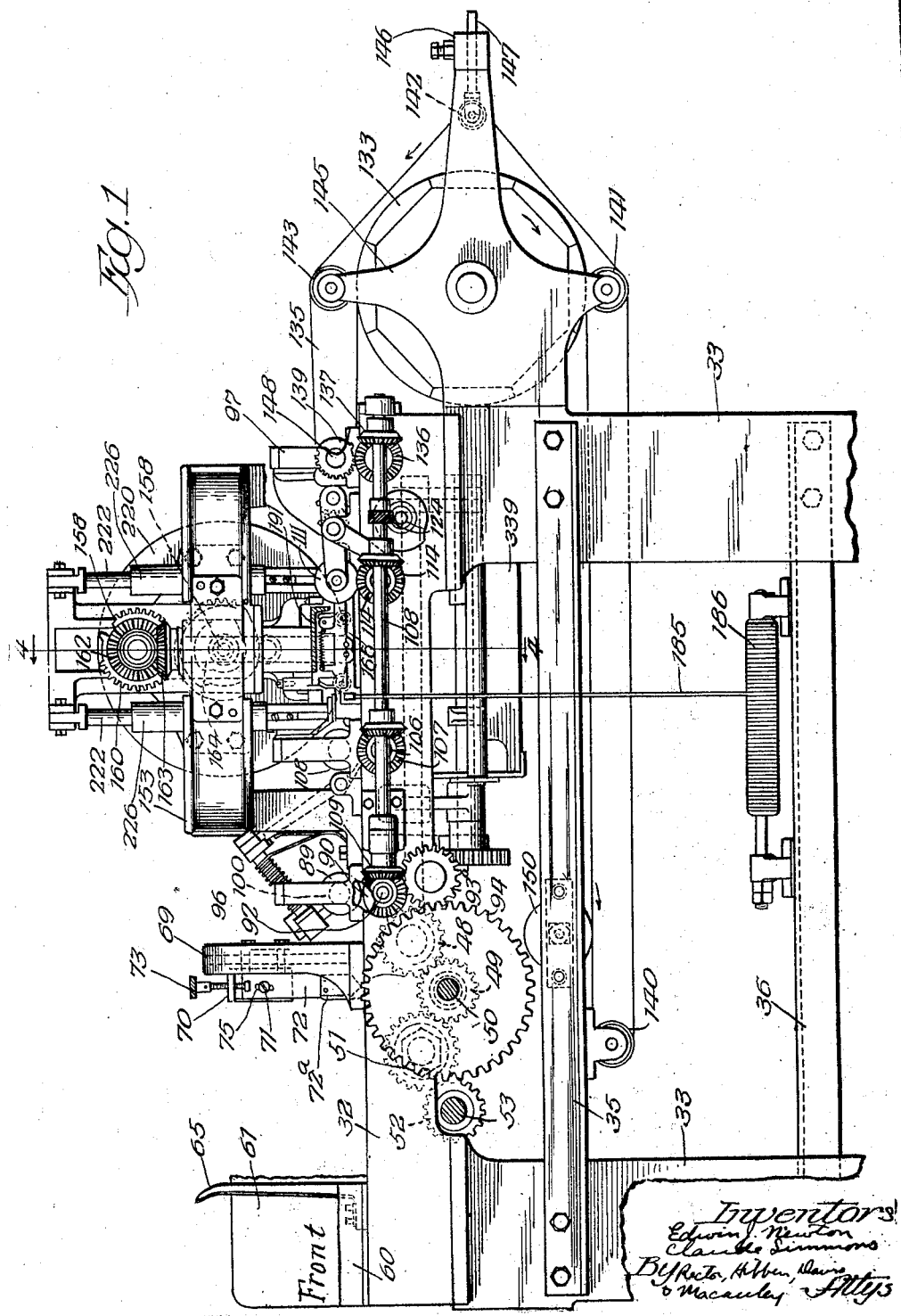

March 24, 1925.
E. J. NEWTON ET AL
1,531,018
TAPE HANDLE APPLYING MACHINE
Filed April 8, 1922    14 Sheets-Sheet 2
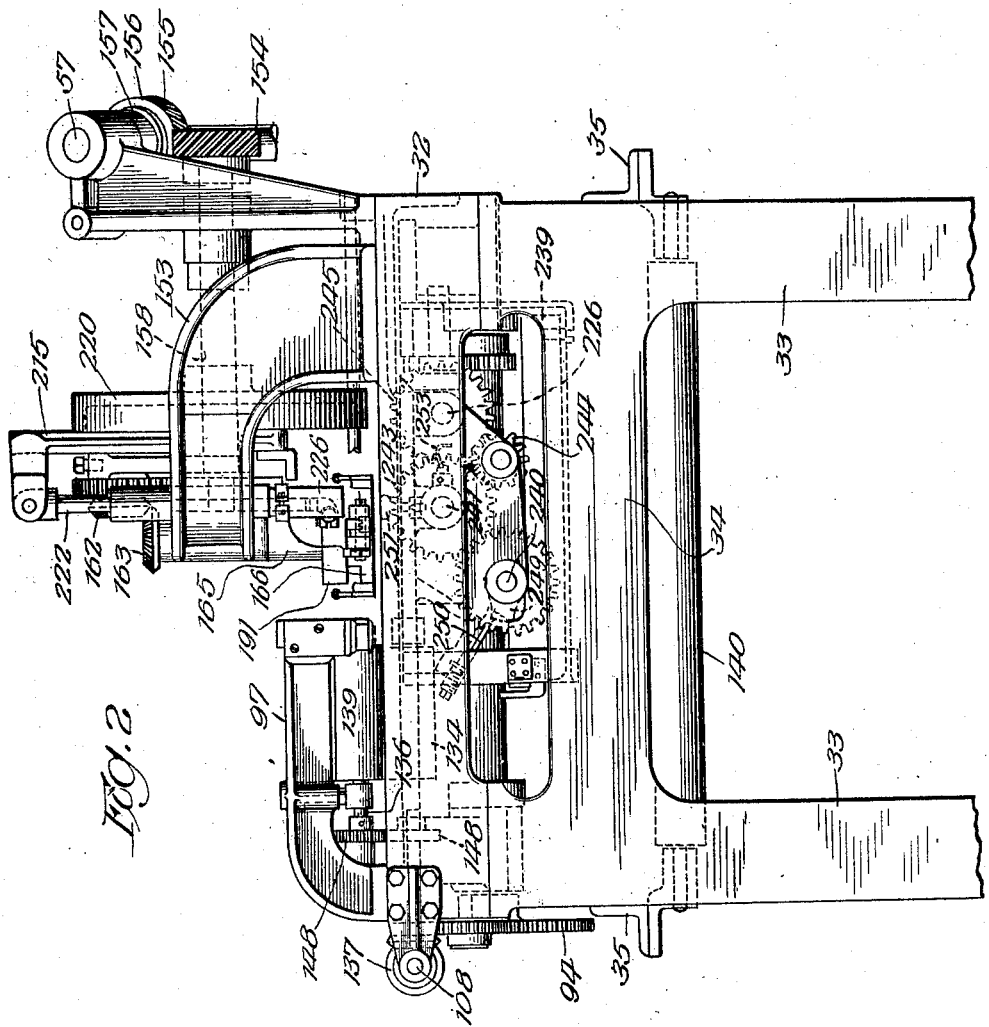

March 24, 1925.
E. J. NEWTON ET AL
1,531,018
TAPE HANDLE APPLYING MACHINE
Filed April 8, 1922   14 Sheets-Sheet 3
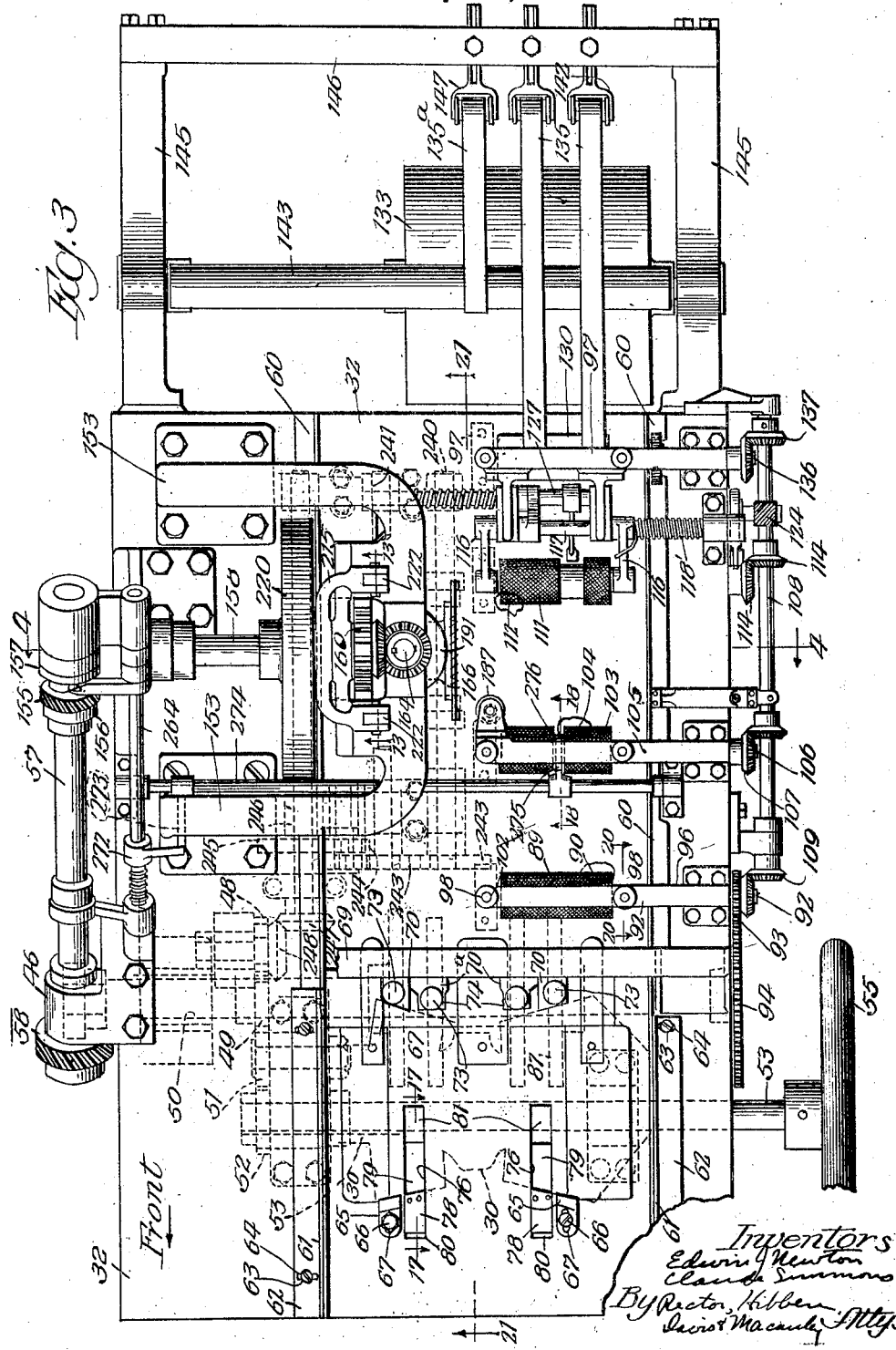

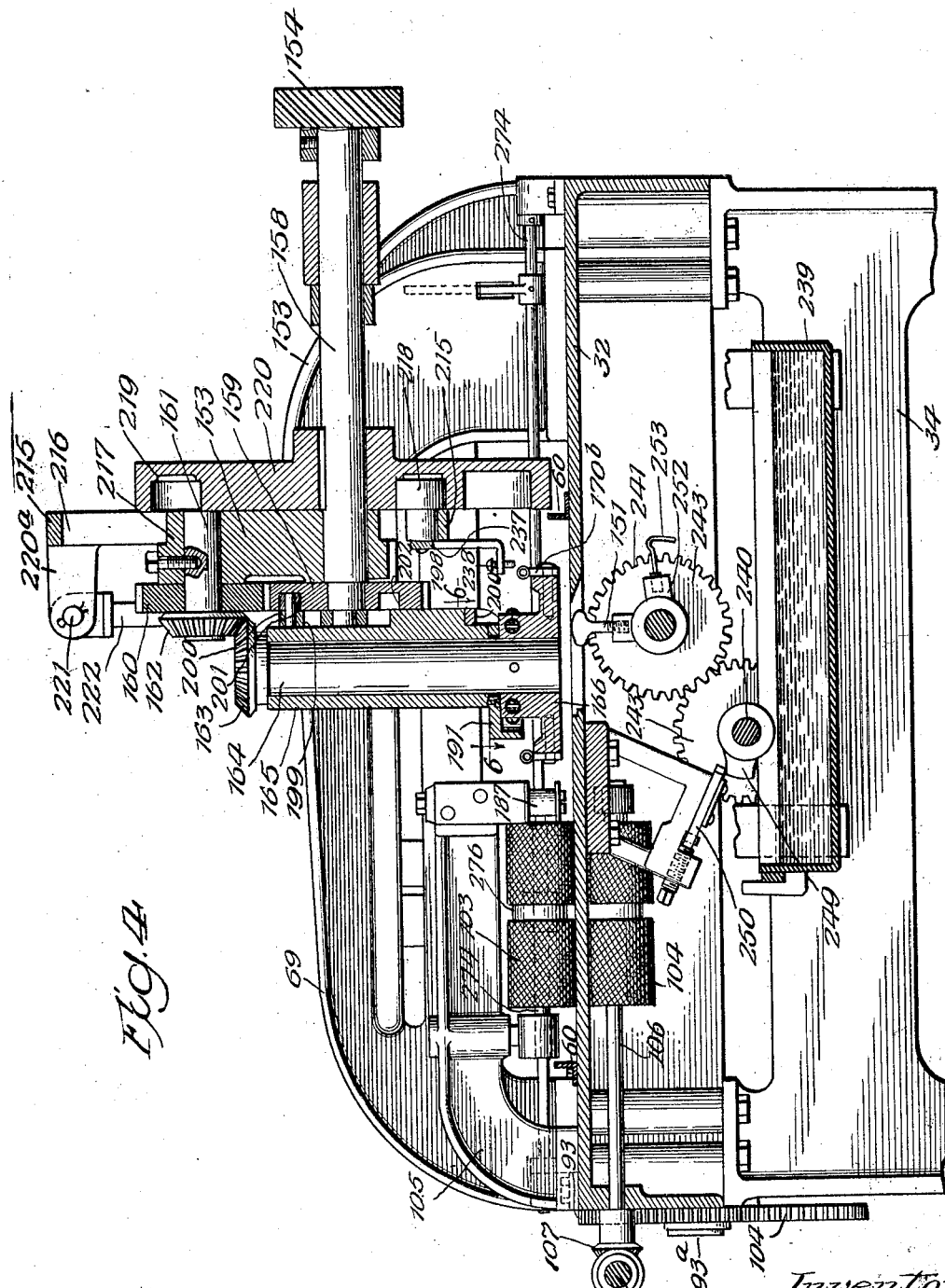

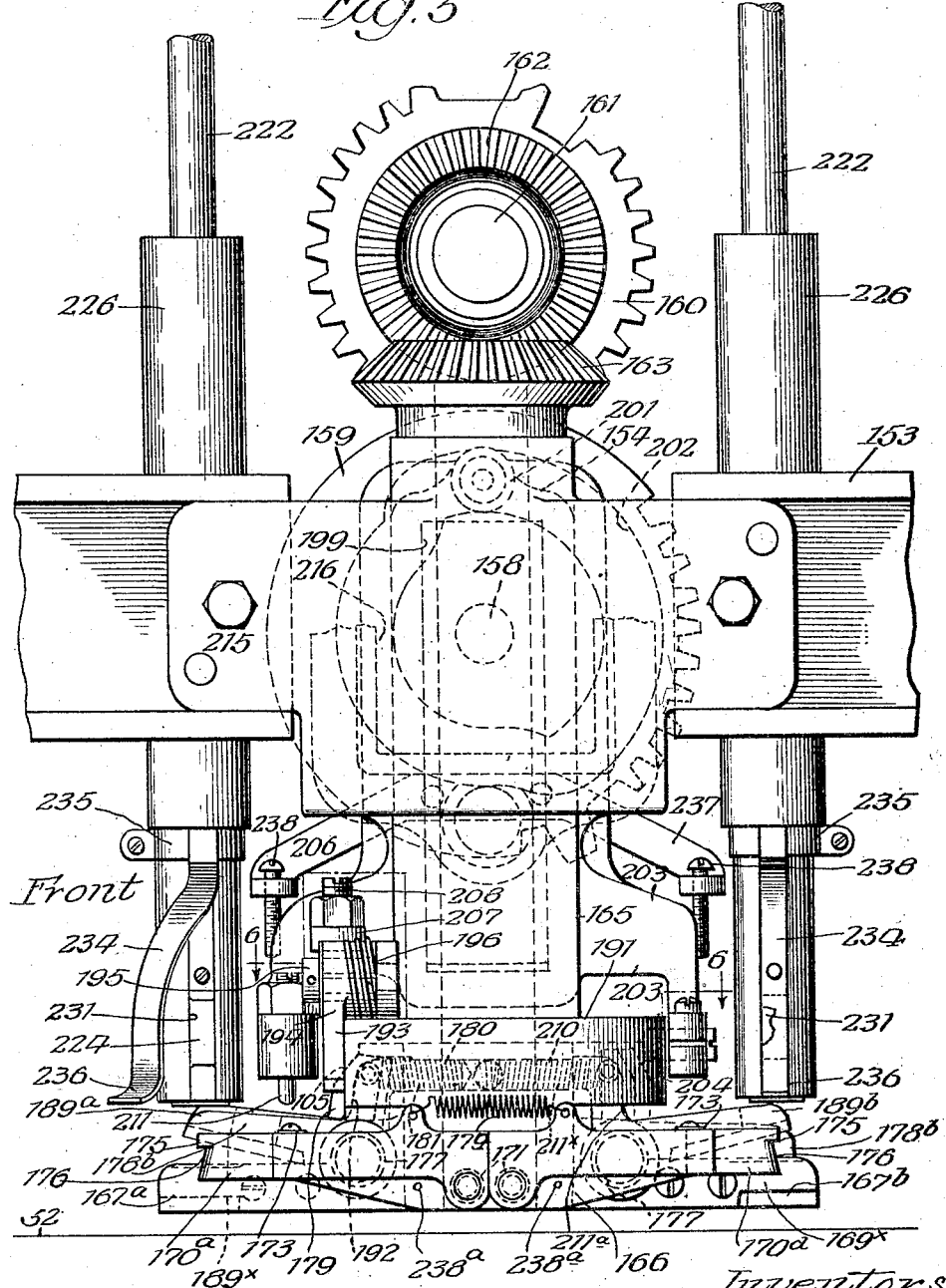

March 24, 1925.  1,531,018
E. J. NEWTON ET AL
TAPE HANDLE APPLYING MACHINE
Filed April 8, 1922  14 Sheets-Sheet 6
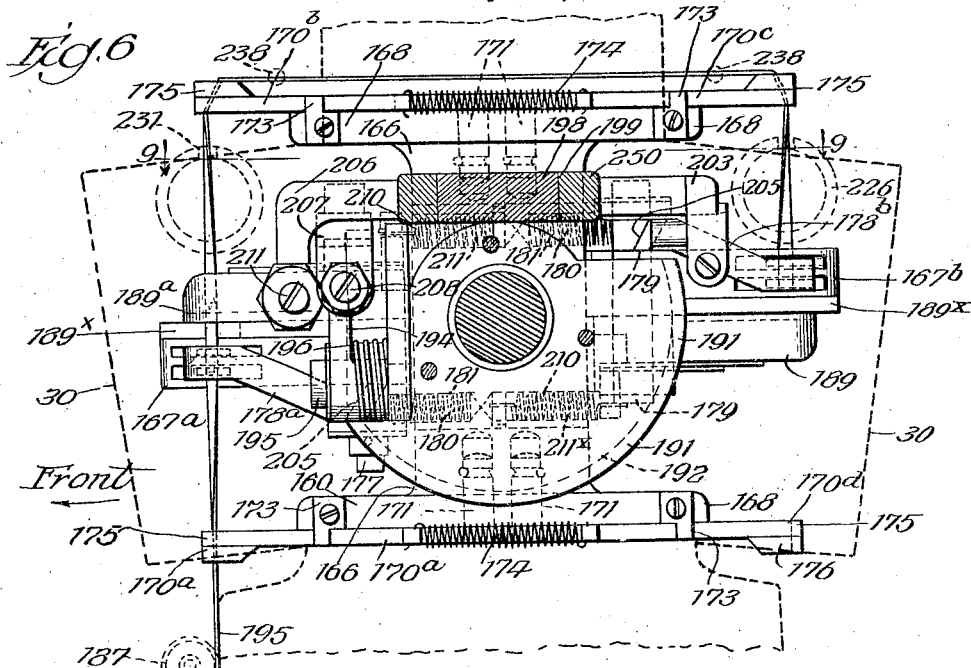
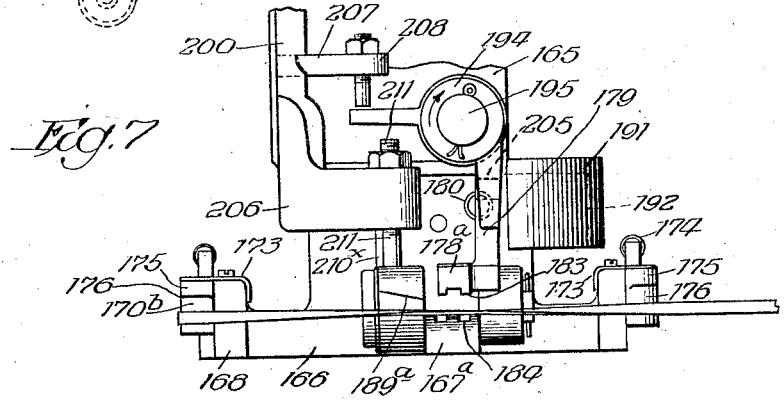
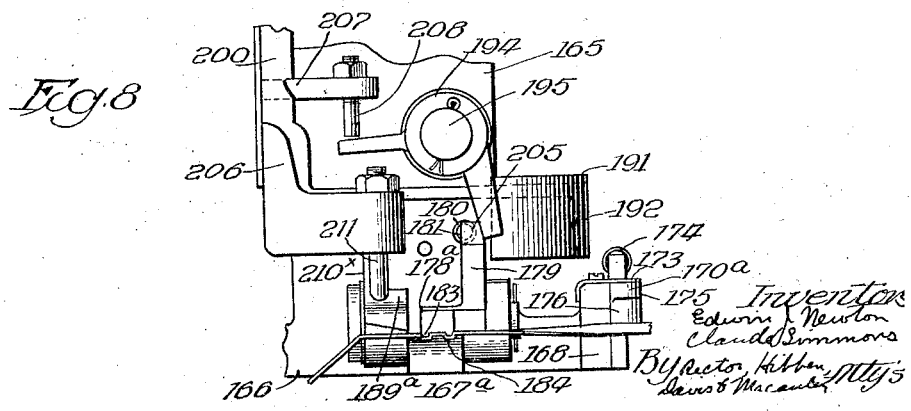

March 24, 1925.
E. J. NEWTON ET AL
TAPE HANDLE APPLYING MACHINE
Filed April 8, 1922 14 Sheets-Sheet 7
1,531,018
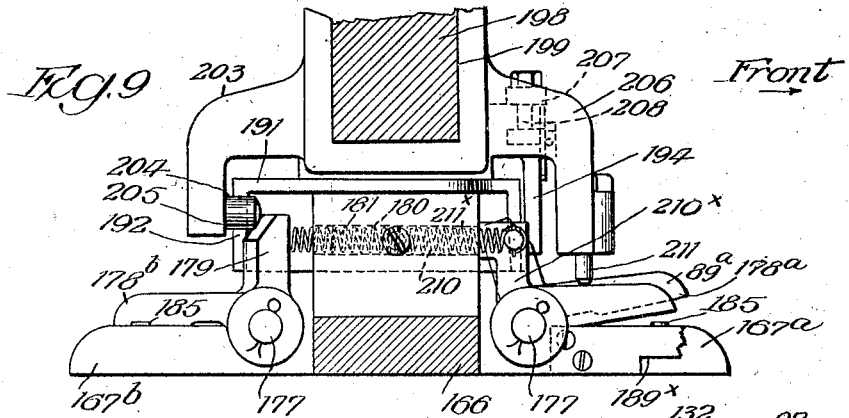
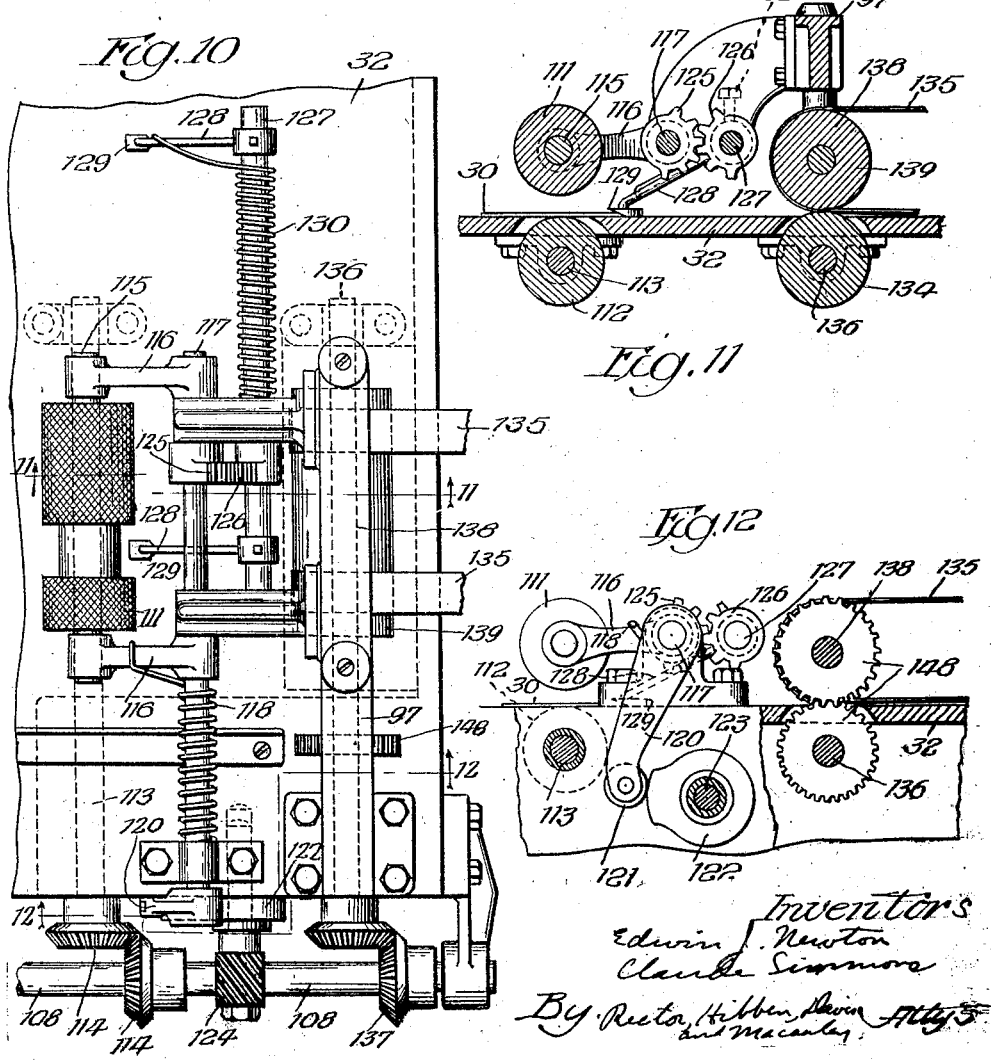

March 24. 1925.
E. J. NEWTON ET AL
1,531,018
TAPE HANDLE APPLYING MACHINE
Filed April 8, 1922    14 Sheets-Sheet 8
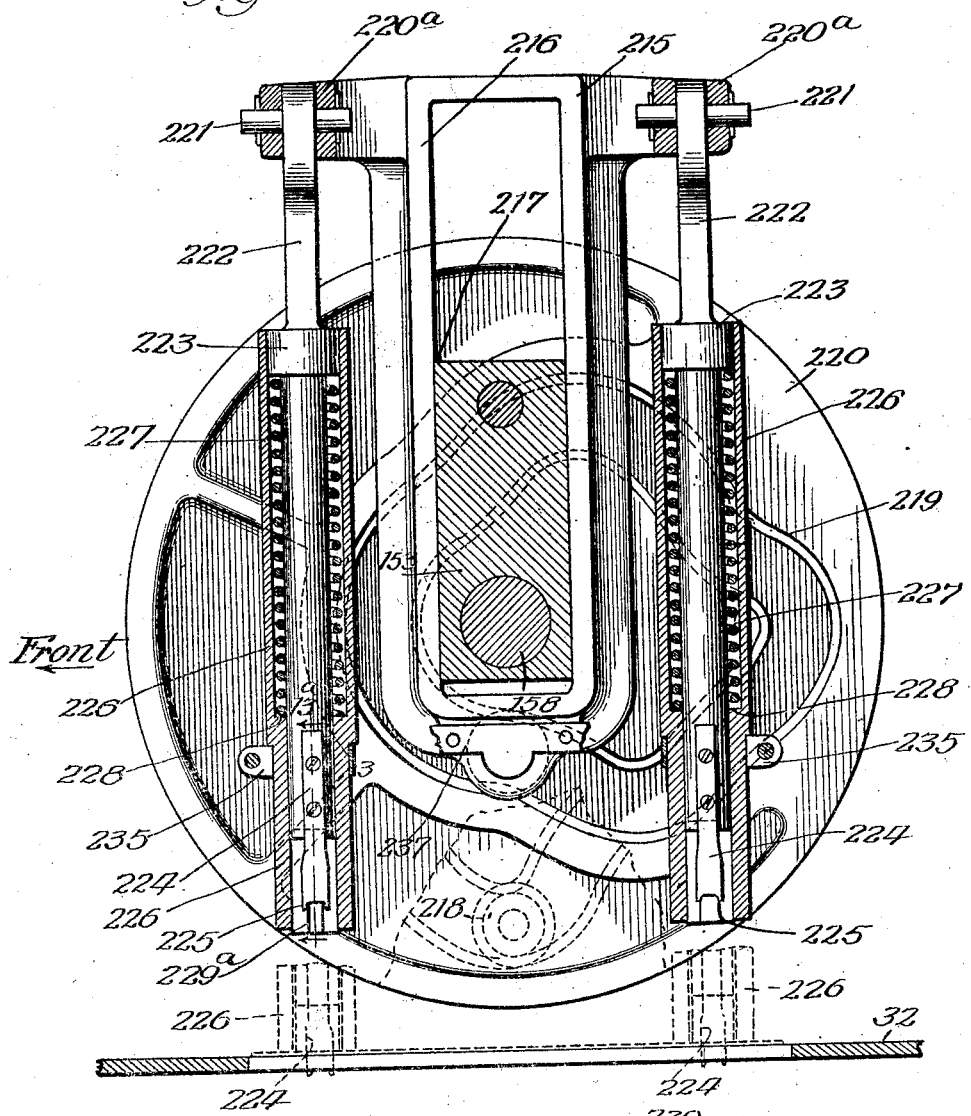
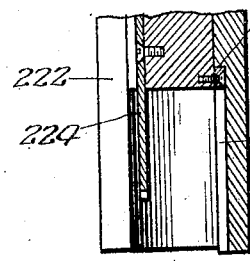

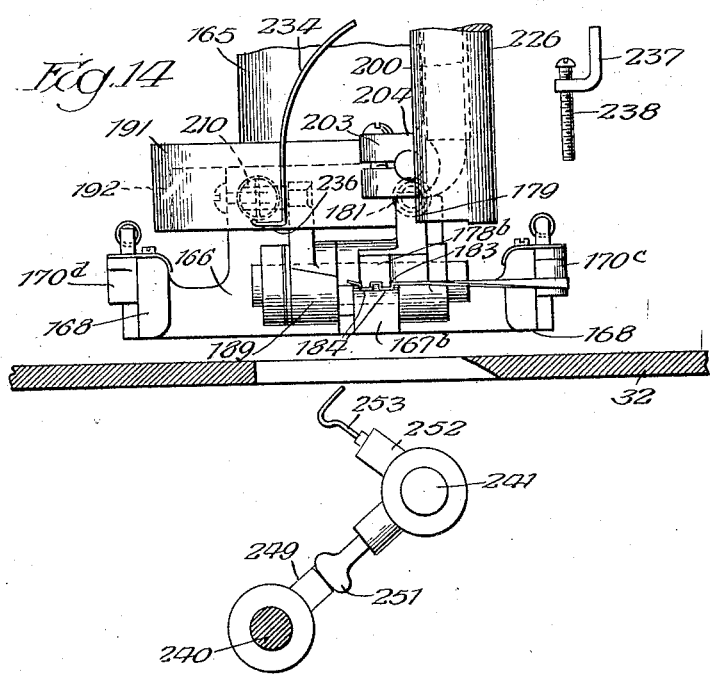
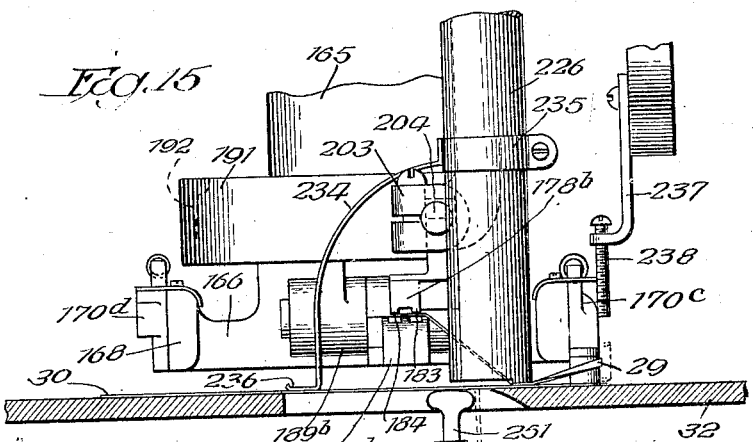
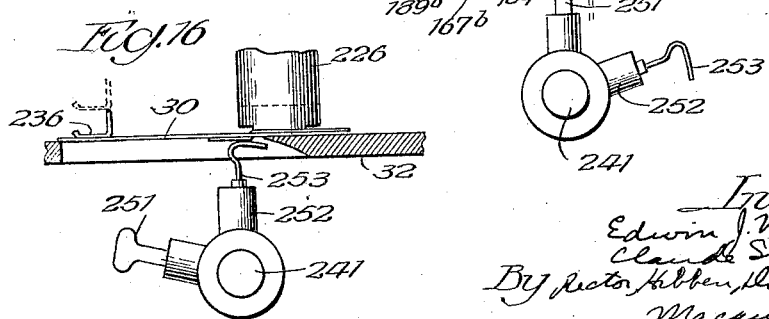

March 24, 1925. 1,531,018
E. J. NEWTON ET AL
TAPE HANDLE APPLYING MACHINE
Filed April 8, 1922    14 Sheets-Sheet 10
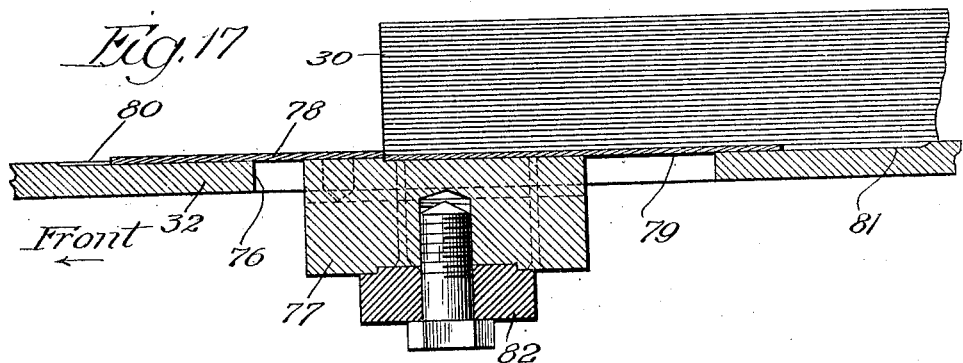
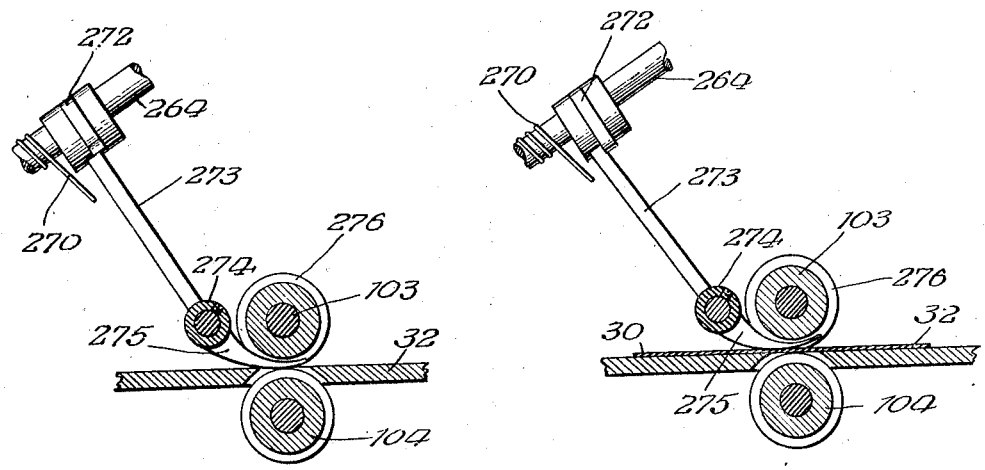
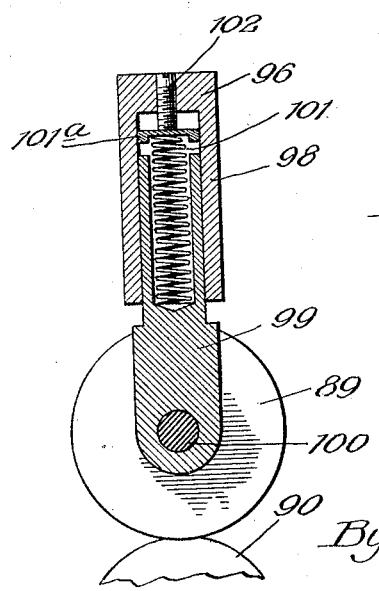
Inventors
Edwin J. Newton
Claude Simmons
By Rector, Hibben, Davis & Macauley Attys

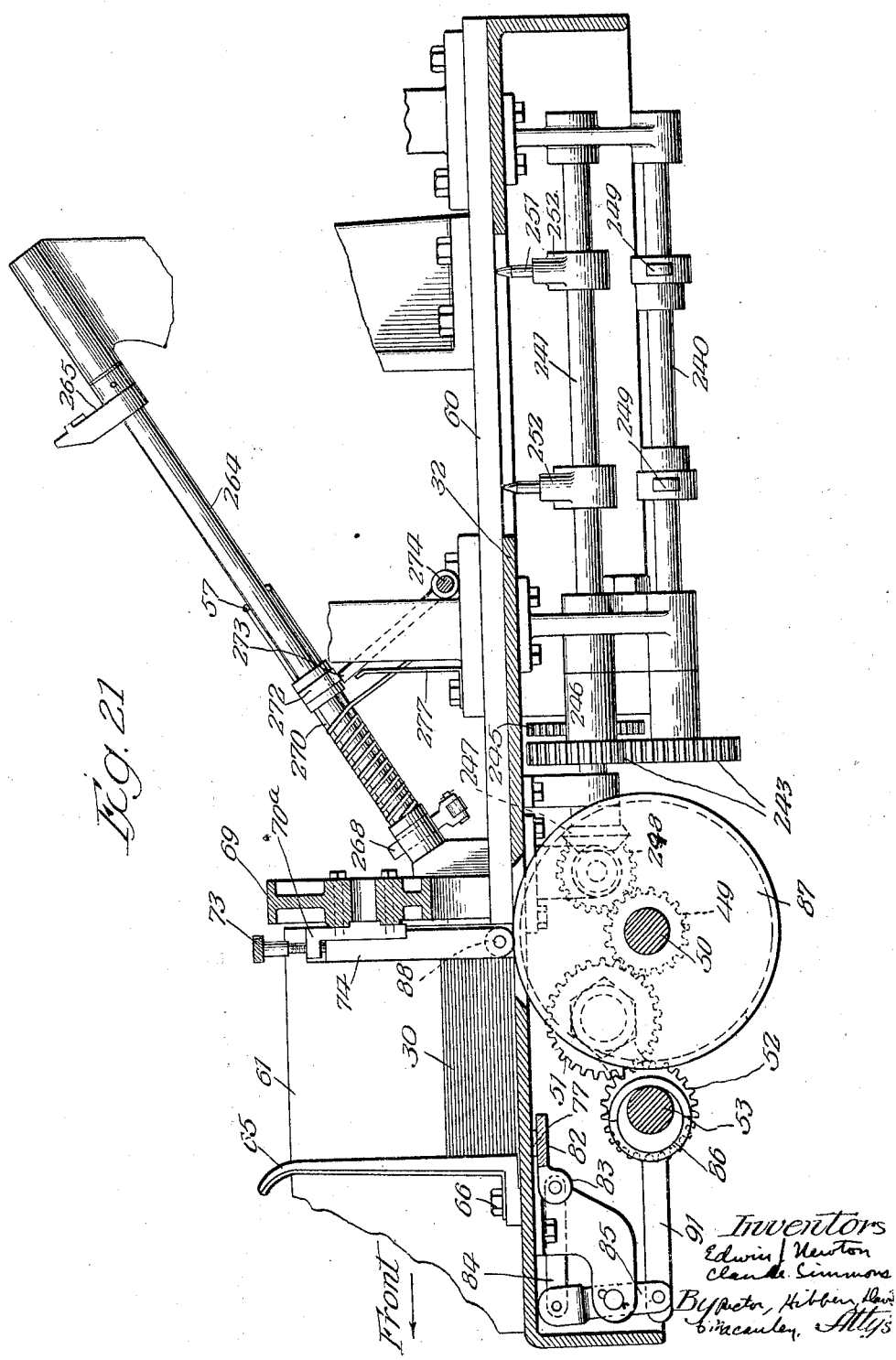

March 24, 1925.
E. J. NEWTON ET AL
1,531,018
TAPE HANDLE APPLYING MACHINE
Filed April 8, 1922    14 Sheets-Sheet 12
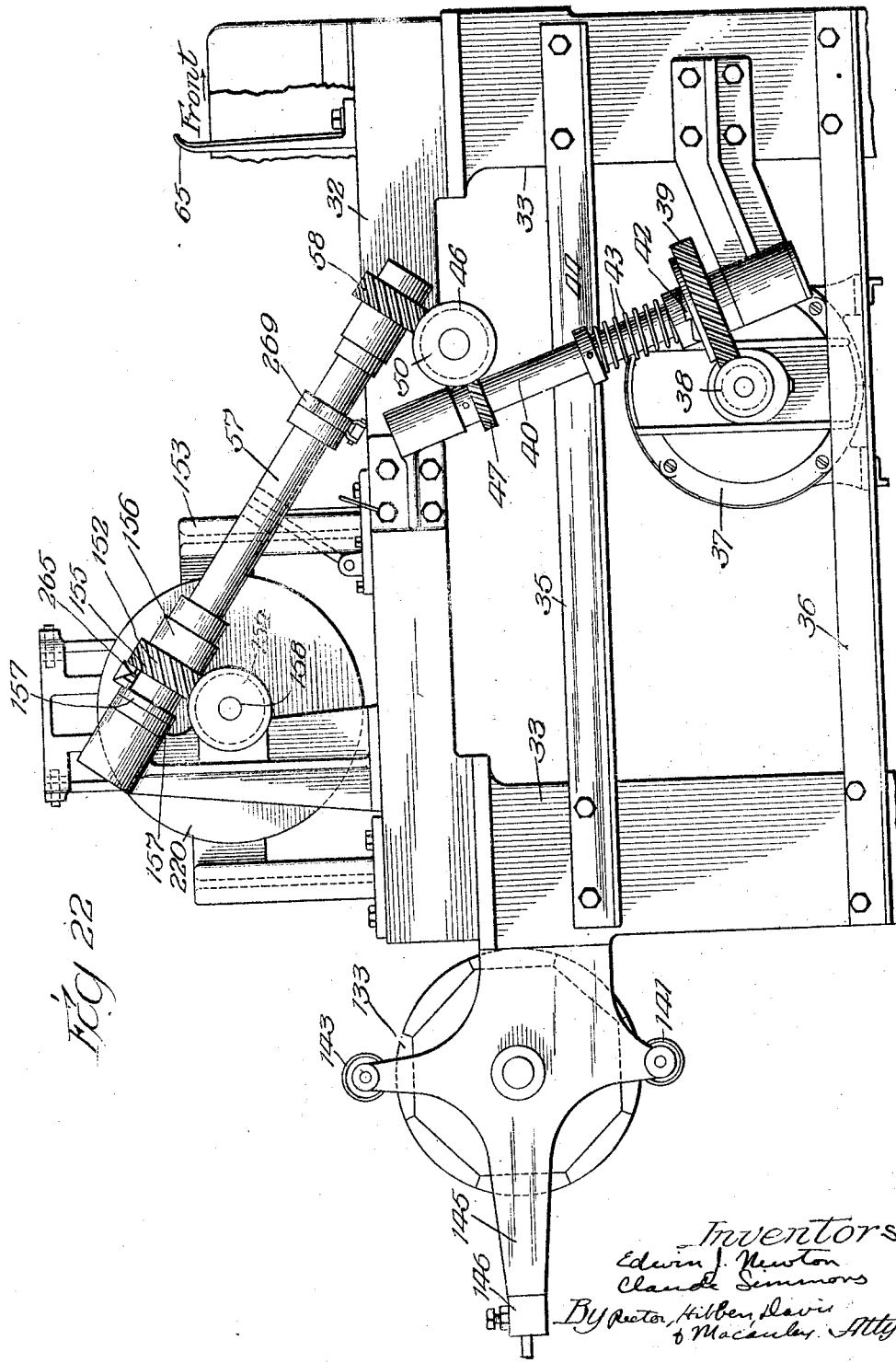

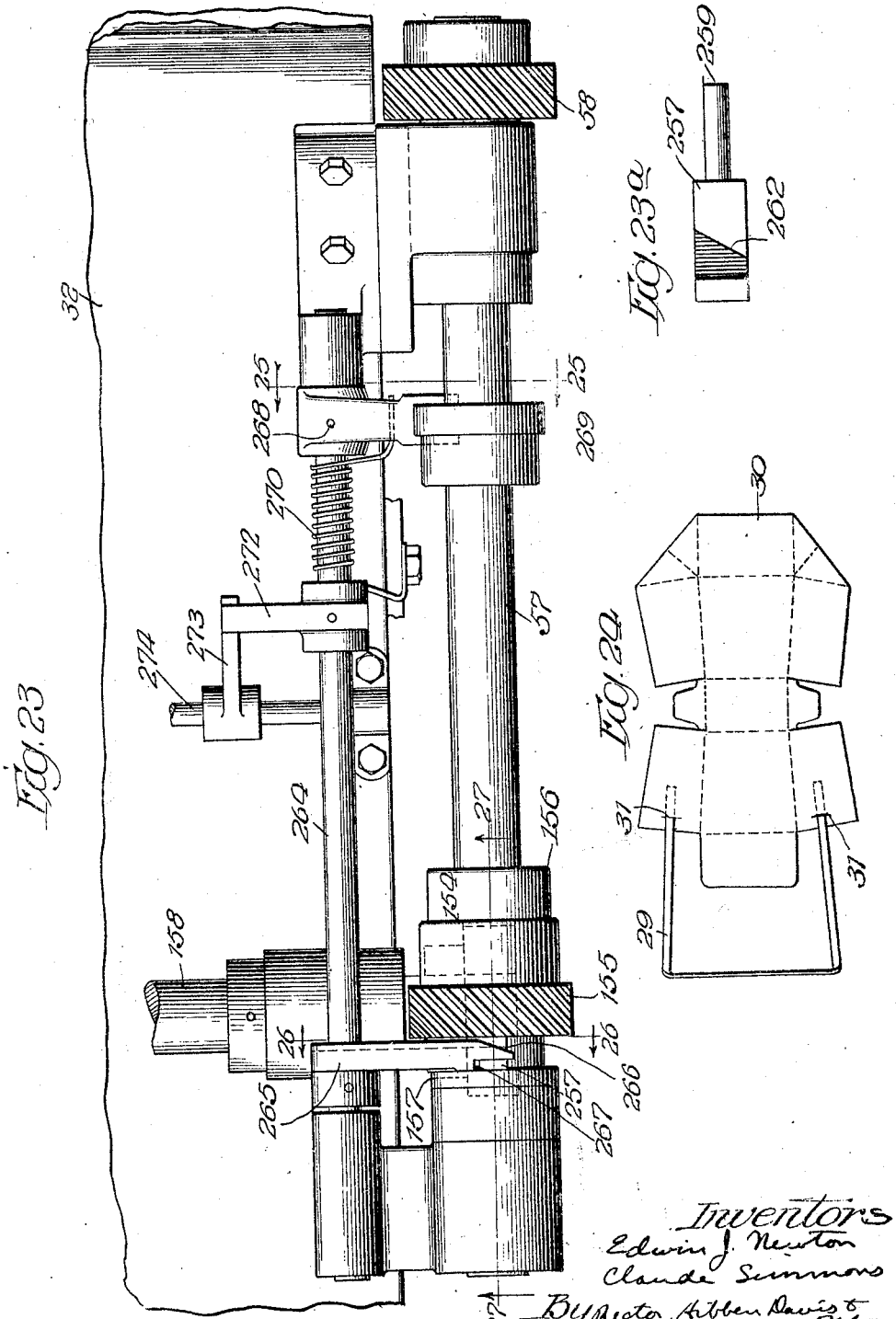

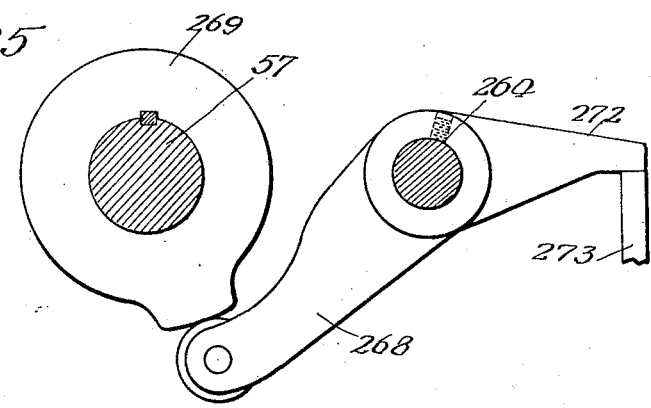
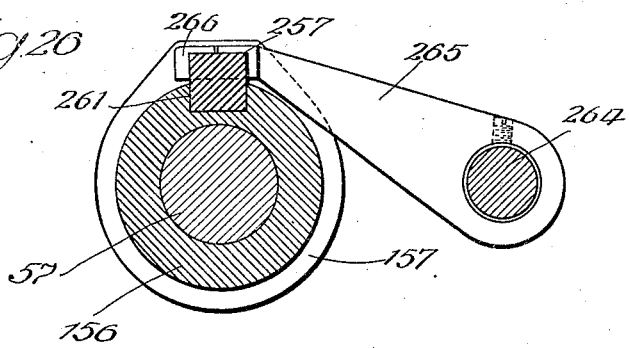
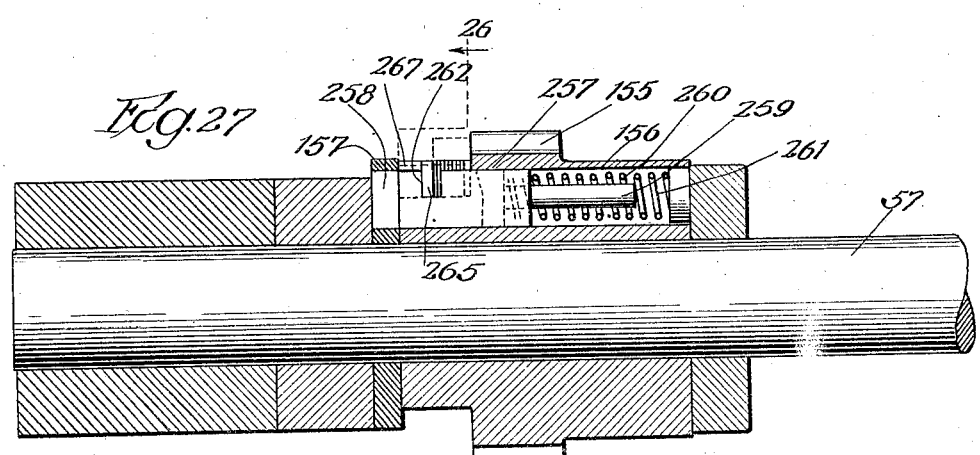

Patented Mar. 24, 1925.

1,531,018

UNITED STATES PATENT OFFICE.

EDWIN J. NEWTON AND CLAUDE SIMMONS, OF CHICAGO, ILLINOIS, ASSIGNORS TO SEFTON MANUFACTURING CORPORATION, OF CHICAGO, ILLINOIS, A CORPORATION OF NEW YORK.

TAPE-HANDLE-APPLYING MACHINE.

Application filed April 8, 1922. Serial No. 550,687.

*To all whom it may concern:*

Be it known that we, EDWIN J. NEWTON and CLAUDE SIMMONS, citizens of the United States, both residing at Chicago, county of Cook, and State of Illinois, have invented certain new and useful Improvements in Tape-Handle-Applying Machines, of which the following is a specification.

Our invention relates to applying carrying handles or bails, formed of tape, to boxes or receptacles, such as ice-cream pails, confectionery boxes and the like formed of paper or other similar material. The principal object of our invention is to construct a novel and improved apparatus for applying tape handles or bails to pail or box blanks, which is simple and efficient in construction and operation and capable of applying the tape bails in rapid succession and each in a minimum period of time, thus enabling its use for extensive quantity production of such boxes and pails.

With the above and incidental objects in view, the invention consists in certain novel features of construction and combinations of parts, the essential elements whereof are recited in the appended claims and a preferred form of embodiment of which is described in detail hereinafter and illustrated in full in the accompanying drawings, which form part of this specification.

Of said drawings, Fig. 1 is a right-hand side elevation of the apparatus embodying our invention; Fig. 2 is a rear elevation of the apparatus, with the blank-carrying belts and supporting means therefor removed; Fig. 3 is a top plan view of the apparatus; Fig. 4 is a section taken on the line 4—4 of Figs. 1 and 3; Fig. 5 is a right-hand side elevation of the tape-feeding and applying mechanisms; Fig. 6 is a horizontal section taken substantially on the lines 6—6 of Figs. 4 and 5; Figs. 7 and 8 are like front elevations of part of the tape-feeding and severing mechanisms, with the parts in Fig. 7 shown in the positions which they assume at the very end of a movement of the head carrying the feeding mechanism, and the parts in Fig. 8 shown in the positions which they assume during operation of the severing mechanism; Fig. 9 is a section taken on the line 9—9 of Fig. 6; Fig. 10 is a top plan view of the blank arresting mechanism and of part of the blank-feeding mechanism; Fig. 11 is a section on the line 11—11 of Fig. 10; Fig. 12 is a section on the line 12—12 of Fig. 10; Fig. 13 is a vertical section through the tape-applying devices, being taken on the line 13—13 of Fig. 3; Fig. 13$^a$ is a vertical section on the line 13$^a$—13$^a$ of Fig. 13; Fig. 14 is a rear elevation showing parts of the tape-applying, severing and feeding devices in the positions which they assume at the end of a tape-feeding operation; Fig. 15 is like Fig. 14 but shows the parts in the position which they assume immediately before the tape-applying needles have been projected through the pail blank; Fig. 16 is a section showing the next step in the operation of the paste applying fingers and wiper members, shown in Fig. 15; Fig. 17 is a section taken on the line 17—17 of Fig. 3; Fig. 18 is a section taken on the line 18—18 of Fig. 3; Fig. 19 is like Fig. 18, except that a blank is shown in position between the feeding rolls; Fig. 20 is a section taken on the line 20—20 of Fig. 3; Fig. 21 is a longitudinal section taken on the line 21—21 of Fig. 3; Fig. 22 is a left hand side elevation of the frame and main driving mechanism for the apparatus; Fig. 23 is a plan elevation of part of the mechanism for operating the tape feeding applying and severing mechanisms and the device for disconnecting it from the main drive mechanism when a blank is not in tape-applying position at the proper time; Fig. 23$^a$ is a top plan view of the plunger of the clutch shown in Fig. 23; Fig. 24 shows a blank adapted to form a folded ice cream pail; Fig. 25 is a section taken on the line 25—25 of Fig. 23; Fig. 26 is a section taken on the line 26—26 of Fig. 23 or Fig. 27; and Fig. 27 is a section taken on the line 27—27 of Fig. 23.

In general, the machine, disclosed in the drawings as embodying the preferred form of our invention, comprises mechanism for feeding the paper blanks, which are to form the ice-cream pails, in rapid succession into position to have the tape handles applied, a rotating head which is given one-half of a revolution during each taping operation of the machine and carrier gripping means to feed a strip of tape from a reel, devices carried by the rotating head for severing the desired length of tape to form the carrying handle, needles or plungers for carrying the ends of the severed strip through apertures or slits in the paper blank, and devices for applying spots of glue to the blank and pressing the ends of the severed strip of tape against the glue spots so that it forms the handle for the pail.

The pail blank.

In Fig. 24 (Sheet 13) one of the blanks 30 is shown with a tape handle 29 applied thereto. The handle near its ends projects through slots or slits 31 in the blank. The blank is adapted to be folded on the lines, indicated in Fig. 24, to form an ice-cream pail, but it is to be understood that we do not wish to limit the use of the invention to applying handles to ice-cream pails, as it is obvious that receptacles, used for different purposes and having different constructions and composed of different materials, may have tape handles applied thereto by a machine embodying our invention. For the sake of convenience, the blank will be called a "pail blank" in this specification, but without intent to limit it to the type of receptacle or pail disclosed.

The frame of the machine.

The frame of the machine comprises a horizontal bed-plate or table 32 supported at the corners by legs 33, the legs at each end being connected by an integral bar 34. The legs are of angle formations and the legs at each side of the machine are connected by angle bars 35 and 36, as best shown in Figs. 1 and 22.

For the sake of convenience the end of the machine from which the pail blanks are fed will be considered the front of the machines and in some of the figures the word "front" over an arrow indicates the direction of the front of the machine.

Driving mechanism.

As shown in Fig. 22, the machine is driven by an electric motor 37, although it is obvious that any other form of power may be used. A worm 38 on the armature shaft of the motor meshes with a worm-wheel 39 loose on the main drive shaft 40 which is supported at its ends in suitable brackets fastened to the frame of the machine. Fast to the worm-gear 39 is one part of a clutch 42, the other part of which is mounted on the shaft 40 in any desired manner so that it rotates with the shaft and is adapted to slide longitudinally of it. The clutch 42, which is of a well known type, is normally maintained in closed or clutched condition by a coil spring 43 compressed between the sliding part of the clutch and a collar 44 fast on the shaft 40. A shaft 50 suitably supported in brackets on the lower side of the bed-plate 32, carries a worm 46 meshing with a worm gear 47 on the shaft 40. The shaft 50 through a pinion 49 (Figs. 1, 3 and 21) thereon, a pinion 51 on a suitable stud and a pinion 52 fast on a shaft 53, rotates the shaft 53 which carries on its right-hand end a hand-wheel 55. It will be understood that these shafts are mounted in suitable brackets, which need not be described specifically herein. The hand wheel 55 is employed to operate the machine manually, if occasion demands, in which event the electric motor is not operated and the clutch 42 (Fig. 22) permits the hand operation without affecting the motor, the clutched parts being permitted to slip on each other during such operation as will be readily understood.

An inclined shaft 57 (Figs. 3, 22 and 23) is journaled adjacent its ends in suitable brackets carried by the bed-plate 32, and is driven by a worm gear 58 fast on the shaft 57 and meshing with the worm 46. The tape-feeding mechanism is operated from the shaft 57, as will be described later.

Pail blank hopper.

Mounted on top of the bed-plate 32 and extending lengthwise thereof are two parallel angle-bars 60 (Figs. 3 and 21) between which the pail blanks are fed through the machine and which serve as guides for the blanks. Secured on the forward end of the bed-plate 32 and in alignment with the vertical flanges of the bars 60 are vertical plates 61 forming the sides of the supply hopper in which the pail blanks 30 are piled or stacked. Angle bars 62 secure, as by spot welding, to the lower ends of the plates 61, are provided with slots 64 through which extend screws 63. Two vertical posts 65 form in effect the forward side of the hopper and these posts are connected to the bed plate 32 by means of screws 66 which project through slots 67 (Fig. 3) in the feet of the posts to permit proper adjustment of the posts. Extending above and transversely of the bed-plate 32 is a frame or bracket 69 carrying two supporting brackets 70, as shown in Figs. 1 and 3. The brackets carry screws 71 (Fig. 1) projecting through corresponding slots 75 in vertically adjustable bars 72 which are vertically adjustable by thumb-screws 73. Two middle brackets 70$^a$ on the frame 69 carry bars 74 (Fig. 21) and the bars 74 may be vertically adjusted by their respective thumb-screws 73. The vertical bars 72 and 74 form in effect the rear end of the hopper.

Pail blank feeding mechanism.

The blanks are fed one at a time upon each rotation of the shaft 50 out of the hopper. The bottom blank is fed to gripping rollers by a reciprocating device and is then fed by sets of gripping rolls into position to have the tape handle applied, in which position it is arrested by automatically operated fingers. When the blank is arrested certain of the feeding rolls are disabled and after the tape handle has been applied such rolls are again enabled to feed the blank to traveling belts which deliver the blanks to the front end of the machine and under the bed-plate 32.

The mechanism for feeding the blank to the first set of feeding rolls is shown in Figs. 3, 17, and 21. The bed-plate is provided with slots 76 in which blocks 77 are adapted to reciprocate. Secured to the upper face of each block 77 are two relatively thin plates 78 and 79 and the rear edge of the plate 78 and the forward edge of the plate 79 partially abut, but the plate 78 is slightly higher than the plate 79 so that the rear projecting edge of the plate 78 contacts only with the forward edge of the lowermost pail blank of the pile in the hopper. The forward end of the plate 78 and the rear end of the plate 79 are adapted to reciprocate in grooves 80 and 81 respectively, which are in alignment with the slots 76 and formed in the upper face of the bed-plate 32. A bar 82 is rigidly connected at its ends to the lower sides of the blocks 77 in the manner shown in Fig. 17. As shown in Fig. 21, the bar 82 is provided with a lug 83 connected to the rear end of a link 84, which at its opposite end is connected to the upper end of a lever 85 centrally pivoted on a bracket depending from the bed-plate 32. The lower end of the lever 85 is connected to a pitman 91 which at its rear end is mounted on an eccentric 86 fast on the shaft 53. It will be obvious that upon each rotation of the shaft 53, the blocks 77 and the attached plates 78 and 79 are first moved rearwardly to feed the lowermost pail blank partially out of the supply hopper, and are then moved forwardly to the position shown in Fig. 17. As the rear projecting edges of the plates 78 engage only the edge of the lowermost blank it is apparent that this blank is the only one which is advanced.

Fast on the shaft 50 are mounted four discs 87 and concentrically raised portions on the two middle discs 87 are adapted to cooperate with rollers 88 mounted in the lower ends of the bars 74. When the bottom pail blank is moved rearwardly by the reciprocation of the plates 78, the blank is moved between the middle discs 87 and the rolls 88 and the raised portions of the discs 87 coact with the rolls 88 to move the blank further rearwardly to a pair of knurled feeding rolls 89 and 90. (Figs. 1 and 3). To positively prevent the second pail blank (from the bottom) from being moved rearwardly when the bottom blank is fed out of the hopper, the lower ends of the two vertical bars 72 (Fig. 1) carry blocks 72ª which are pointed at their lower ends and positioned over the two end discs 87, the distance between the pointed ends and peripheries of these discs 87 being approximately equal to the thickness of a blank. The roll 90 is fast on a shaft 92 to which is secured a pinion 93 meshing with a pinion 93ª which in turn meshes with a gear 94 fast on the shaft 50. An overhanging bracket 96 which is like a bracket 97 shown in side and plan elevations in Figs. 2 and 10, supports the roll 89 through mechanism best shown in Fig. 20 and now to be described. The bracket 96 is provided with two bosses 98 in each of which is mounted a vertical plunger 99 and the plungers support at their lower ends a rod 100 upon which the roll 89 is mounted. A spring 101 is compressed in a bore in the upper end of each plunger 99 and its upper end engages against a disc 101ª which is adapted to be adjusted by a screw 102 to compress the spring to the desired extent and thereby exert the required pressure between the rolls 89 and 90.

The blank is fed by the rolls 89 and 90 to a pair of cooperating rolls 103 and 104 (Figs. 1, 3 and 4). The roll 104 is fast on a shaft 106, journaled in brackets on the lower side of the bed plate 32, and the roll 103 is carried by a bracket 105 which is like the bracket 96 and carries means for supporting the roll 103 in the same manner as the roll 89 is carried on the bracket 96. The shaft 106 carries a bevel pinion 107 which meshes with a like pinion on a shaft 108 mounted in brackets on the right-hand side of the bed-plate. The forward end of the shaft 108 carries a bevel pinion 109 meshing with a like pinion on the end of the shaft 92, the rolls 103 and 104 being actuated through this gearing.

The rolls 103 and 104 advance the blank to the next pair of feeding rolls 111 and 112 (Figs. 3, 10, 11 and 12). The roll 112 is fast on a shaft 113, supported on brackets fast to the underside of the bed plate 32 and this shaft is rotated through a pair of bevel pinions 14, one of which is fast on the shaft 113 and the other fast on the shaft 108. The roll 111 is fast on a shaft 115 journaled at its end in arms 116 fast on a shaft 117, which is suitably mounted in brackets on the frame 97 and on the bed plate 32. A spring 118, coiled about the shaft 117, as best shown in Fig. 10 tends to retain the roll 111 in yielding engagement with the roll 112. Fast on the right-hand end of the shaft 117 is an arm 120 carrying at its lower end a roller 121, which cooperates with a cam 122 loose on a stub shaft 123 and rotated through worm-gearing 124 (Figs. 1 and 10) from the shaft 108.

A gear segment 125 (Figs. 10, 11 and 12)

is fast on the shaft 117 and meshes with a gear segment 126 fast on a shaft 127 suitably supported in the brackets on the frame 97. Fast on the shaft 127 are two arms 128 carrying arresting feet 129 on their outer ends. A spring 130 is coiled about the shaft 127 to take up any slack or "back-lash" between the gear segments 125 and 126. The rolls 103 and 104 feed the blank to the position shown in Fig. 11. The roll 111 at such time is then in the raised position shown in Figs. 11 and 12, so that the rollers 111 and 112 are out of feeding relationship and the arresting feet 129 engage the rear end of the pail blank 30 to arrest and firmly hold the blank in such position.

After the tape handle has been applied to the blank, while it is in this arrested position, as will be described later, the cam 122 permits the spring 118, which is much stronger than the spring 130, to move the roll 111 downwardly into engagement with the blank and to raise the feet 129 out of engagement therewith. The coaction of the rolls 111 and 112 then advances the blank so that it is gripped and fed rearwardly by a roll 134 and two endless belts 135. The roll 134 is fast on a shaft 136 which is rotated through intermeshing bevel gears 137 on the shafts 108 and 136. Above the roll 134 is mounted on a shaft 138 corresponding roll 139 about which the belts 135 pass. The shaft 138 is carried by the bracket 97 through devices similar to those carrying the shaft 100, as above described. The belts 135 are parallel and, in effect, constitute a single belt for carrying the blanks. These belts pass about a drum 133, about a roll 140 (Fig. 1), mounted on a rod supported in brackets depending from the side rails 35, under a roll 141, around rollers 142, and over a roll 143. A third belt 135ª (Fig. 3) is the same as belts 135 except that it is shorter and passes around the roll 143 instead of around the roll 139. The drum 133, and rolls 141 and 143 are suitably mounted on rods supported at their ends in brackets 145 fastened to the rear end of the machine. The rear ends of the brackets 145 support a cross bar 146 in which is adjustably mounted forked holders 147 supporting the rolls 142, the holders 147 being adjustable to properly tension the individual belts 135 and 135ª. The shaft 138, carrying the roll 139 is rotated through intermeshing pinions 148 fast on the shafts 136 and 138 respectively, (Figs. 2 and 12). The rotation of the roll 139 causes the belts 135 and 135ª to travel in the direction indicated by the arrows in Fig. 1 so that the blanks are fed by the cooperation of the roll 134 and the belts to the drum 133. The blanks then pass between the belts and the drum and as they leave the drum they are carried by the upper sides of the belts and under a roll 150, supported by the side rails 35, and fall off of the upper end of the belt in front of the roll 140 into any suitable receptacle. The roll 150 is employed to prevent the blanks from tilting too soon as they begin to leave the end of the belt, so that the blanks are desposited uniformly in horizontal position in the receptacle.

Tape-feeding mechanism.

In general, the tape-feeding mechanism comprises a rotating head which is given one-half of a revolution upon each cycle of operation of the machine and is provided with gripper and associated devices which feed the tape the distance of one tape handle upon each half revolution of the head. The head is then maintained in stationary position while the pail blank is in arrested positon, as above described, when a length of tape is severed and applied to the blank to comprise the tape handle therefor. This mechanism is mounted over the bed plate 32 and is supported in a frame or bracket 153 (Figs. 1, 2, 3 and 4).

Journaled in the frame 153 and a bracket on the bed plate 32 is a shaft 158 which carries a worm 154 meshing with a worm wheel 155 (Fig. 22) carried by a clutch member 156 of a clutch 152 mounted on the shaft 57. This clutch will be described later. Fast on the right-hand end of the shaft 158 is a gear 159 (Figs. 4 and 5) adapted to coact with a gear 160 journaled on a stud 161 mounted in the frame 153. Fast to the gear 160 is a bevel gear 162 meshing with a bevel gear 163 fast on the upper end of a vertical shaft 164, which is journaled in a long boss 165 on the frame 153. Fast on the lower end of the shaft 164 is the member or head 166, which carries the tape-gripping and severing devices. The stop-motion gears 159 and 160 are so constructed that the gear 160 and hence the shaft 164 and head 166, are given one-half of a revolution upon each complete rotation of the gear 159, or in other words, the head is rotated one-half of a revolution and then held stationary during each cycle of operation of the machine. As shown in Fig. 6 the head 166 is somewhat I-shaped in plan elevation, with intermediate arms 167ª and 167ᵇ which are off-set with respect to each other and parallel with the projections 168 forming the ends of the I.

Pivoted on the projections 168 on one side of the head is a pair of pawls 170ª and 170ᵈ (Figs. 5 and 6) and on the other side is a pair of like pawls 170ᵇ and 170ᶜ. These pawls are pivoted on the head by means of pins 171. The projections 168 of the head carry fingers 173 which engage the upper edges of these pawls, the pawls normally being kept in such engagement by springs 174, each connected at its ends to projections in its respecting pair of pawls. The outer ends of the pawls are thickened and provided with shoulders 175 and inclined and curved surfaces 176 below the shoulders. As best shown in Fig. 9, the upper portions of the outer ends of the arms 167ᵃ and 167ᵇ of the head are curved. Pivoted to the projection 167ᵃ by means of a pin 177, is a gripper arm 178ᵃ having a vertical extension 179 and a like gripper arm 178ᵇ is mounted in like manner on the projection 167ᵇ. Springs 180 (Figs. 6 and 9) are mounted in apertures or holes 181 in the boss of the head and are compressed against the inner sides of the arms 179, thereby tending to move the arms 178ᵃ and 178ᵇ into engagement with the top faces of the projections 167ᵃ and 167ᵇ, respectively. As shown in Figs. 7, 8, 14 and 15 the bottom face of each arm 178ᵃ and 178ᵇ is provided with a groove and the upper face of each arm 167ᵃ and 167ᵇ is provided with two grooves 184 and the ribs 183 formed by the groove in the lower face of the arm 178ᵃ or 178ᵇ is adapted to project into the grooves 184 in the respective projection 167ᵃ or 167ᵇ.

Tape 185, from which the carrying handles for the pails are severed, is fed from a supply roll 186 (shown in Fig. 1) up around a roller 187 (Figs. 3 and 4) mounted on the bracket 105, to the feeding mechanism. In Fig. 6 the head 166 and parts carried thereby are shown in stationary position with a length of tape in position to be severed and applied as a handle to the pail blank, which is indicated in broken line in this figure. The tape rests against the inclined edge 176 of the pawl 170ᵃ as shown in Figs. 5, 6, 7 and 8 and rests flat on top of the projections 167ᵃ. The tape is omitted in Fig. 5 for the sake of clearness. With the tape in this position it extends around the inclined edges 176 of the pawls 170ᵇ and 170ᶜ and at its end is gripped between the gripper lever 178ᵇ and the projection 167ᵇ. The tape is severed by a knife 189ᵃ and the gripper lever 178ᵃ is operated by its spring 180 so that the end of the tape, which is unsevered and between the lever 178ᵃ and projection 167ᵃ, is gripped between these parts. After the severed piece of tape has been applied as a carrying handle to the pail blank, the head is given one-half of a rotation, as above described, and the gripper lever 178ᵇ is then carried to the position in which the gripper lever 178ᵃ is shown in Figs. 6 and 7. During this movement of the head the tape is bent around the ends of the pawls 170ᵃ and 170ᵈ and as the upper curved end of the projection 167ᵇ engages the tape it first engages the lower edge of the tape and causes the tape to twist slightly so that at the end of the movement of the head the tape lies flat on top of the projection 167ᵇ, the tape being slid over the curved surface of the projection 167ᵇ as it moves to its position of rest. At the end of the movement the tape is resting against the inclined edge 176 of the pawl 170ᶜ.

The mechanism for operating the gripper levers 178ᵃ and 178ᵇ will now be described. Secured to the lower end of the boss 165 of the frame 153 is a control member 191 (Figs. 4, 5, 6, 7, 9 and 14). This control member 191 comprises a substantially semicircular member having a depending flange 192 which forms a semicircle. As best shown in Figs. 5, 7 and 8, a bell-crank lever 194 is pivoted on a stud 195 projecting from the boss 165, and a spring 196, coiled about a boss on the lever 194, tends to rock the lever 194 in the direction, indicated by the arrow in Fig. 7. As shown in the latter figure, the downwardly extending arm of the lever 194 is beyond the end of the flange 192 when the head comes to rest, so that the arm 179 of the gripper lever 178ᵃ, whose horizontal arm then projects forwardly, engages the rear side of this downwardly extending arm of the lever 194, hence preventing the gripper lever from being moved by its spring into gripping position. The boss 165 is provided with a rectangular projection 198 (Figs. 4, 6 and 9) which fits into an elongated opening 199 in a reciprocating frame 200, the projection 198 serving as a guide for the frame in its reciprocatory movements. As shown in Figs. 4 and 5, the frame 200 at its upper end carries a roller 201 which projects into a groove 202 formed in the right-hand face of the gear 159. An arm 203 of the frame 200 carries a horizontally extending stud 204 which projects over an inclined surface 205 on the vertical arm of the gripper lever 178ᵇ when the head is in the position shown in Figs. 5, 6, 9 and 14. It is understood of course that the other lever 178ᵃ is under the stud 204 at the end of the next succeeding feeding movement of the head. Projecting from an arm 206 on the other side of the frame 200 is an arm 207 carrying a stud 208 which engages the upper side of the horizontal arm of the lever 194. The cam groove 202 is so constructed that it lowers the frame 200 to operate the knife 189ᵃ at the proper time to sever a length of tape, which is to form the handle, and during this movement the stud 208 rocks the lever 194 to move the vertical arm of the latter out of engagement with the vertical arm of the gripper lever 178ᵃ, so that the spring 180 for the latter moves it into gripping position approximately at the instant the tape is severed by the knife. The parts are shown in this position in Fig. 8. After a tape handle has been severed from the tape, the head begins its one-half revolution and at that time the stud 204 is in lowered position and the gripper lever 178ᵇ has been rocked thereby so that its vertical arm 179 is back of the flange 192 as it moves out of engagement with the stud 204. At the end of this movement of the head this gripper lever 178ᵇ would assume the position of the gripper lever 178ᵃ shown in Fig. 7 in which position it would be out of engagement with the flange 192 and engage the inside of the vertical arm of the lever 194, being thereby prevented from being moved into gripping position. As the tape is severed the stud 208 moves the lever 194 to the position shown in Fig. 8, whereupon the spring 180 for the particular gripper lever in engagement therewith rocks the latter into gripping position. The purpose of employing the lever 194 to prevent movement of the gripper levers into engagement with the tape as they move out of engagement with the flange 192 will be explained later.

*Severing mechanism.*

The knives 189ᵃ and 189ᵇ are pivotally mounted on the studs 177 which carry the gripper arms 178ᵃ and 178ᵇ. The knives are normally held out of cutting position as best shown in Figs. 7 and 9, by suitable springs 210, connected at their outer ends to the vertically extending arm 210ˣ on the knives and positioned in holes 211ˣ in the boss of the head 166. When the frame 200 is lowered as above described, a stud 211 projecting downwardly from the arm 206 engages the knife 189ᵃ or 189ᵇ as the case may be, to lower the latter, and during this movement of the knife the cutting edge engages with the upper forward edge or corner of a knife 189ˣ on the projection 167ᵃ and 167ᵇ to sever the tape.

*Tape applying needles and operating means therefor.*

The needles or plungers which insert the ends of the tape through the slots or slits 31 in the pail blank 30 and the operating means therefor are best shown in Figs. 4, 5, 13, 14 and 15 and will now be described.

A vertically reciprocating frame 215 (Figs. 4 and 13) is provided with a central rectangular opening 216 through which projects a rectangular projection 217 on the frame or bracket 153, the projection 217 serving as a guide for the frame 215. The frame 215 at its lower end carries a roller 218 which projects into a cam groove 219 formed in the face of a cam or disc 220 fast on the shaft 158. The frame 215 at its upper end has laterally extending projections 220ᵃ to which are pivotally mounted by means of pins 221 the upper ends of two needle operating bars 222. Enlarged annular shoulders 223 are formed on the bars 222 and below the shoulders the bars are circular and of uniform diameter. Secured to the lower ends of the bars 222 are the needles 224 which are made of thin sheet-metal and have fingers 225 on their lower ends. The bars 222 are mounted in pressure sleeves 226 which have their interior diameter reduced at their lower ends of the bars 222, while the interior diameter of the upper part of each sleeve is of substantially the same diameter as the enlarged portion 223, so that a spring 227 may be located and compressed between the enlarged portion 223 and the shoulder 228 in the sleeve. As shown in Fig. 13ᵃ, the lower end of each bar 222 has a laterally extending projection engaging in a vertical groove 229ᵃ formed in its sleeve 226 and the shoulder 230 formed by the groove 229ᵃ normally engages the projection, to retain the sleeve 226 on the bar 222. The projections are in the form of blocks secured to the bars 222 by screws, as shown. These projections and grooves also prevent rotation of the sleeve 226. The right hand sides of the sleeves 226 at their lower ends are provided with vertical slots 231. The lower ends of the sleeves 226, opposite the slots 231, are extended downwardly slightly, and the bottom sides of the extensions are preferably knurled to firmly grip the tape 185 when the sleeves are lowered.

The cam groove 219 is so designed that the sleeves 226 are lowered into engagement with the pail blank, as shown in Fig. 15, after the head 166 has come to rest and before the tape-handle is severed. At this time the forward gripper arm 178ᵃ (or 178ᵇ as the case may be) is retained out of gripping position so that the lower ends of the sleeves 226 engage the tape and lower the tape against the blank, and draw more tape under the forward gripping lever to accommodate the extra length needed, because the portions of the tape between the pressure sleeves and the projections 167ᵃ and 167ᵇ extend at an angle, as shown in Fig. 15, and hence the portions of the tape between the engaging ends of the pawls 170ᶜ and 170ᵇ (which are rocked downwardly at the same time) and the projections 167ᵃ and 167ᵇ are increased in length. In this figure the parts are shown in the positions which they assume after the sleeves 226 have lowered the tape into engagement with the pail blank and before the gagement with the pail blank and before the needles 224 carry the ends of the tape-handle through the pail blank, the gripper arm 178ᵇ having just been raised. The levers 170ᵇ and 170ᶜ are rocked by the tape downwardly about their pivots 171 and in opposition to their spring 174 to the position shown in Fig. 15, because the tape is in engagement with the inclined ends 176 of the pawls. It will be evident that the knurled portions of the lower ends of the sleeves 226 engage the tape and press it against the blank before the lower ends of the needles 224 engage the tape, and that as the sleeves are provided with the slots 231 the left-hand edges of the sleeves do not engage the tape, so that when the tape is severed the needles are able to force the ends through the slits 31 in the blank, as indicated in dotted lines in Figs. 13 and 15. The needles engage the tape approximately at the instant that the right-hand knife 189ª (or 189ᵇ as the case may be) is operated to sever the handle from the tape strip.

For the purpose of holding the blank in its flattened position while the handle is applied, spring fingers 234 (Figs. 5, 14 and 15) are secured at their upper ends to collars 235 fastened on the sleeve 226. When the sleeves are lowered as described above, the feet 236 on the lower ends of the spring members 234 press against the tops of the blank and prevent it from bending when the tape handle is applied. It will be observed that the left-hand member 234 (as viewed in Fig. 5) is bent laterally and this is done so that it will not engage the portion of the tape between the roller 187 and the forward gripping device.

*Tape kick-off mechanism.*

As stated above, when the sleeves 226 are lowered so that their lower ends press against the blank, the two pawls 170ᵇ and 170ᶜ, or 170ª and 170ᵈ, as the case may be, are rocked downwardly because the tape tautly engages the inclined surfaces 176 at the ends of the pawls. In order to force the tape out of engagement with the pawls near the end of the downward movement of the needles 224, the following described mechanism is employed. Secured to the lower end of the frame 215 is a bar 237 (Figs. 4, 5, 14 and 15), the ends of which extend horizontally and support screws 238 which are positioned over the portion of the tape between the ends of the pawls 170ª and 170ᶜ (or 170ᵇ and 170ᵈ) which support the tape here. As the frame approaches the end of its downward movement the lower ends of the screws 238 engage the tape and positively force it off of the ends of the pawls 170ᵇ and 170ᶜ, or 170ª and 170ᵈ. The extreme lowered position of the screws is shown in dotted lines in Fig. 15. Pins 238ª limit the movement of the pawls 170ª, 170ᵇ, 170ᶜ and 170ᵈ (Fig. 5).

*Paste-applying and wiper mechanism.*

After the sleeves 226 are lowered into engagement with the pail blanks and before the needles 224 insert the ends of the severed strip of tape through the slits 31 in the pail blank, spots of glue are applied to the blank immediately below the slits, then the needles force the ends of the tape through the slits and are withdrawn to an intermediate position in which they are held so that the lower ends of the sleeves 226 remain in engagement with the blank, during which period the ends of the tape, projecting through the blank, are pressed against the spots of glue, the sleeves 226 being finally elevated to normal position to permit the continued feeding of the pail blank. The mechanism for accomplishing these functions is shown in Figs. 4, 14, 15, 16 and 21 and will now be described.

A paste tank or pot 239 (Fig. 4) is suitably supported on the underside of the bed plate 32. Two parallel shafts 240 and 241 are mounted in brackets depending from the bed plate and carry intermeshing gears 243. The gear 243 on the shaft 241 meshes with a broad pinion 244 (Figs. 2 and 3) which in turn meshes with a gear 245 fast on a shaft 246. These shafts are mounted in suitable brackets and the forward end of the shaft 246 carries a bevel gear 247 meshing with a bevel gear 248 fast to a gear 48 which meshes with the gear 49, the shafts 240 and 241 being given one complete rotation upon each tape-applying cycle of operation of the machine through such gearing. Fast on the shaft 240 are two arms 249, which are adapted to dip into the glue in the pot 239, and adjustable scrappers 250 (Fig. 4) suitably mounted in a bracket, are adapted to cooperate with the ends of the arm 249 to regulate the amount of glue to be transferred to the blank. Fast on the shaft 241 are two levers 252 in one arm of which are mounted glue transferring arms 251. As is well understood in the art, the glue on the ends of the arms 249 is transferred to the ends of the arms 251 which, during the revolution engage the blank immediately under the slits or slots 31. Mounted in the other arms of the levers 252 are wiper arms 253 formed of spring metal, these arms 253 being adapted to engage the ends of the tape, which have been projected through the blank, and force such ends against the spots of glue deposited by the arms 251, as illustrated in Fig. 16. As above stated, the arms 251 deposit the glue on the blank before the needles are projected downwardly through the slots 31 in the blank, and then the wipers 253 press the ends of the tape, which have been projected through the blank, against the spots of glue after the needles have been withdrawn but before the sleeves 226 are raised out of engagement with the top of the blank, the sleeves in this manner serving as means to hold the blank firmly against movement when the glue is applied and the ends of the tape are pressed against the glue spots.

*Clutch 152 and disablement thereof.*

It is obvious from the above description that after all of the blanks in the stack in the supply hopper have been run through the machine, or in the event the feeding mechanism therefor fails so that no blank is in position to have the tape handle applied, it is desirable to interrupt the operation of the tape-applying mechanism as otherwise lengths of tape would be severed and would become entangled in the machine. For the purpose of interrupting the operation of the tape-applying mechanism, in such an event, the clutch 152 is employed and disabling mechanism is used to disconnect it.

Referring to Figs. 23, 23ª, 26 and 27, a plunger 257 square in cross section, is slidably mounted in a longitudinal opening 261 through the clutch member 156 loose on the shaft 57, and the member 157 which is fast on the shaft 57, is provided with a square hole 258 of the same cross-section. The plunger 257 carries a stud 259 about which is coiled a spring 260 which is compressed between the plunger and a plug in the end of the opening 261. The plunger 257 is provided with a cross-slot or groove 262. Parallel to the shaft 57 and mounted in the same brackets is a shaft 264 fast to which is an arm 265. The outer end of the arm 265 is provided on one side with an inclined surface 266 and on the opposite side with a shoulder 267. Another arm 268, fast on the shaft 264, carries a roller (Fig. 25) adapted to ride on the periphery of a cam 269 fast on the shaft 57. A spring 270 (Fig. 23) coiled around the shaft 264, tends to rock the shaft 264 in a clockwise direction (as viewed in Figs. 25 and 26) and the cam 269 is so designed that it rocks the shaft 264 positively and in a counter-clockwise, thus moving the bottom of the outer end of the arm 265 into engagement with the periphery of the member 156. Then before the plunger 257 is carried by the rotation of the shaft 57 into engagement with the arm 265, the spring 270 rocks the shaft 264 to move the arm out of engagement with the member 156, if there is a blank in tape-applying position at such times. A third arm 272 is fast on the shaft 264 and projects over arm 273 fast on a shaft 274 (Figs. 18, 19, 21 and 23). This shaft, which is suitably mounted in brackets on the bed plate 32, carries an arm 275 which is fast thereto and extends between the rolls 103 and 104 and projects into a groove 276 formed in the roll 103. As shown in Fig. 21 a vertical leaf spring 277 engages under the arm 273 and thereby tends to rock the shaft and arm 275 in a clockwise direction as viewed in Figs. 18 and 21.

As a blank 30 moves under the arm 275, the arm 273 is rocked counter-clockwise from the position shown in Fig. 18 to the position shown in Fig. 19, so that its outer end is moved out from under the arm 272. Therefore as the cam-projection on the cam 269 passes out of engagement with the roller on the arm 268 the spring 270 is free to rock the shaft 264 and thereby raise the outer end of the arm 265 out of path of movement of the clutch plunger 257. If, however, a blank is not moved into position to have a tape-handle applied, the arm 273 is in the position shown in Fig. 18 and, as its outer end is then under the arm 272 the spring 270 is not permitted to rock the arm 265 out of the path of movement of the plunger 257 and hence the inclined surface 266 first engages the inclined side of the groove 262 of the plunger to move the latter towards the right to the position shown in Figs. 23 and 27, the clutch being shown disconnected in these views. At the end of such movement of the plunger its end has been withdrawn from the opening 258 in the disc 157 and at the same time the side of the plunger engages the shoulder 267 on the arm 265 to positively arrest movement of the member 156 and hence the clutch is disconnected and the head and mechanism associated with the shaft 158 are not operated.

The operation of the above described machine, embodying my improvements, will be readily understood from the above description; to recapitulate the blanks are fed in rapid succession out of the supply hopper, the bottom blank being fed at each cycle of operation of the machine. The bottommost blank is fed to the first set of feeding rolls 89 and 90 by the reciprocation of the plates 78 and the feeding rolls 89 and 90 feed the blank to the pair of feeding rolls 103 and 104 which in turn feed the blank to the position shown in Fig. 11, in which position it is arrested by the arresting sheet 129. During this movement of the blank the rotating head 166 is given one-half of a revolution to measure and carry a length of tape equal to the length of the handle to the position shown in Figs. 6, 7 and 8. Next the frame 215 is lowered and the pressure sleeve 226 during this movement of the frame carries the tape into engagement with the arrested pail blank. At approximately the time that the tape is carried into engagement with the blank the forward knife severs the strip of tape and the forward gripper lever 178ª (or 178ᵇ) is released to engage the end of the tape.

Spots of glue are then applied by the arms 251 to the pail blank immediately below the slits 31 and immediately thereafter the ends of the tape, which has been severed, are projected through the slits by the fingers 224 and at the end of the downward limit of movement of the frame 215 the screws 238 kick the tape off of the ends of the rocked pawls 170ᵇ and 170ᶜ, or 170ª and 170ᵈ, as the case may be. The needles are then withdrawn within the sleeve and while the sleeves are still holding the tape against the blank the arms or wipers 253 press the ends of the tape against the glue spots, the handle then being applied to the pail blank.

The sleeves 226 are then raised and the feed roller 111 moved into cooperative relation with the arrester pail blank so that the pair of feeding rolls 111 and 112 feed the blank to the feed roller 134 and the belts 135, the blank then being fed by the belts to the front end of the machine where the blank is deposited into a receptacle under the bed plate. When the roll 111 is lowered into engagement with the pail blank the arresting feet 129 are raised to permit the feeding of the blank by the rolls 111 and 112.

While we have herein described in some detail the particular embodiment of our invention, for the purposes of full disclosure, it will be understood by those skilled in the art that many changes in detail might be made without departure from the spirit or scope of our invention hereinafter claimed.

We claim:—

1. In a machine of the class described, the combination of a rotating device, means thereon for gripping the tape, and means for twisting the tape as it is moved into position to be gripped, so that it lies flat in the gripping means.

2. In a machine of the class described, the combination of a rotating device, means thereon for gripping the tape, and means on said device having a curved or inclined surface for engaging the tape and twisting the same during rotation of said device.

3. In a machine of the class described, the combination of a tape feeding device, tape gripping means on the device, and means on the device having an inclined or curved surface for engaging and twisting the tape as the device is moved to carry the gripping means into cooperative relation with the tape.

4. In a machine of the class described, the combination of a rotating head, means for giving the head one half of a rotation upon each taping operation, means on opposite sides on the head for gripping the tape, and means on opposite sides on the head for twisting the tape as it is moved into position to be gripped so that it lies flat in the gripping means.

5. In a machine of the class described, the combination of a rotating device and gripping means thereon comprising two members one of which is formed to engage the tape and twist the same as it moves into position between said members.

6. In a machine of the class described, the combination of a rotating head, means for giving the head one half of a rotation upon each taping operation, a tape gripping device on each side of the head and each comprising a pair of members one of which is formed to engage the tape and twist the same as it moves into position between said members.

7. In a machine of the class described, the combination of a rotating device, and gripping means thereon comprising a member fast on the head and a second member movable into engagement with the first member, the first member being provided with an inclined or curved surface adapted to engage the tape and twist the same as it moves into position between the members.

8. In a machine of the class described, the combination of a rotating head, means for giving the head one half of a rotation upon each taping operation, and gripping means on opposite sides of the head, each means comprising a member fast on the head and a second member movable into engagement therewith, the first member being provided with a curved or inclined surface which engages and twists the tape as the latter moves into position between the members.

9. In a machine of the class described, the combination of a rotating head, pawls on the head having ends inclined to maintain the tape thereon, and gripping means on said head and having means for twisting the tape as it moves into position to be gripped so that it lies flat in the gripping means.

10. In a machine of the class described, the combination of a rotating head, means for giving the head one half of a rotation upon each taping operation, a pair of pawls on each side of said head and having inclined ends to maintain the tape thereon and a gripping device on each end of said head and having means for twisting the tape.

11. In a machine of the class described, the combination of a rotating head, means for giving the head one half of a rotation upon each taping operation, a pair of pawls on each side of said head and having inclined ends to maintain the tape thereon, and a gripping device on each end of said head and having an inclined or curved surface for engaging the tape and twisting the same during movement of the head.

12. In a machine of the class described, the combination of a rotating head, means on the head for gripping the tape, and a pair of pivoted pawls on each side of the head having inclined ends for maintaining the tape in position thereon.

13. In a machine of the class described, the combination of a rotating head, means for giving the head one half of a rotation upon each taping operation, gripping devices on opposite ends of the head, a pair of pivoted pawls having inclined ends on each side of the head, and means for applying the tape as a handle to the pail blank the pawls being rocked by the tape which engages said inclined ends.

14. In a machine of the class described, the combination of a rotating head, means for giving the head one half of a rotation upon each taping operation, gripping devices on opposite ends of the head, a pair of pivoted pawls having inclined ends on each side of the head, means for applying the tape as a handle to the pail blank, the pawls being rocked by the tape, and means for forcing the tape off of the inclined ends of the pawls when the same have been rocked.

15. In a machine of the class described, the combination of a rotating head, means for rotating the head, a gripping device on the head, pivoted pawls on the head having inclined ends for maintaining the tape thereon, means for carrying the tape into engagement with the pail blank and thereby rock the pawls through the tape, and means for forcing the tape off of the pawls when the same have been rocked.

16. In a machine of the class described, the combination of a rotating head, means for rotating the head, a gripping device on the head, pivoted pawls on the head, the tape engaging the ends thereof, means for moving the tape into engagement with the pail blank, a frame for actuating said moving means, and means carried by said frame for engaging the tape and forcing the same off of the pawls when the tape is carried into engagement with the pawl blank.

17. In a machine of the class described, the combination of a rotating head, means for giving said head one half of a rotation upon each tapering operation, a pair of pivoted pawls on each side of the head, a gripping device on each end of the head, the tape being bent around the ends of the pawls of one pair during each operation, means for moving the tape into engagement with the pail blank, and means for forcing the tape off of the ends of the pawls when the same is carried into engagement with the pail blank.

18. In a machine of the class described, the combination of a rotating head, means for giving said head one half of a rotation upon each taping operation, a pair of pivoted pawls on each side of the head, a gripping device on each end of the head, the tape being bent around the ends of the pawls of one pair during each operation, means for moving the tape into engagement with the pail blank, a frame carrying the last mentioned means, and means on the frame for forcing the tape off of the ends of the pawls when the same is carried into engagement with the pail blank.

19. In a machine of the class described, the combination of means for automatically feeding the pail blanks into tape applying position, a rotating head carrying tape feeding mechanism, and operating mechanism for operating the blank feeding mechanism and rotating the head and comprising means for giving the head one half of a rotation and then maintaing the same stationary while the tape is applied to the pail blank upon each tape applying operation of the machine.

20. In a machine of the class described, the combination of means for automatically feeding the pail blanks into tape applying position, a rotating head carrying tape feeding mechanism, and operating mechanism for operating the blank feeding mechanism, and rotating the head and comprising stop-motion gears for giving the head one half of a rotation and then maintaining the same stationary while the tape is applied to the pail blank upon each tape applying operation of the machine.

21. In a machine of the class described, the combination of means for automatically feeding the pail blanks into tape applying position, a rotating head carrying tape feeding mechanism and operating mechanism for operating the blank feeding mechanism and rotating the head in but one direction and then maintaining it stationary while the tape is applied to the pail blank upon each taping operation of the machine.

22. In a machine of the class described, the combination of means for automatically feeding the pail blanks into tape applying position, a rotating head carrying tape feeding mechanism, and operating mechanism for continuously operating the blank feeding mechanism and intermittently rotating the head and comprising stop motion gears for rotating the head and then maintaining it stationary while the tape is applied to the pail blank upon each taping operation of the machine.

23. In a machine of the class described, the combination of blank feeding mechanism, tape feeding and applying mechanism, common operating means for both of said mechanisms, a clutch associated with said feeding and applying mechanism, and means operated under the control of the pail blanks for controlling the operation of said clutch.

24. In a machine of the class described, the combination of blank feeding mechanism, tape feeding and applying mechanism, common operating means for both of said mechanisms, a clutch associated with said feeding and applying mechanism, an arm rocked into and out of the path of movement of the clutching member of the clutch at each operation of the machine, an arm moved by a pail blank upon each operation and maintained in position to hold the first mentioned arm in effective position to disconnect the clutch when a pail blank is not moved into tape applying position.

25. In a machine of the class described, the combination of blank feeding mechanism, tape feeding and applying mechanism, common operating means for both of said mechanisms, a clutch associated with said feeding and applying mechanism, and means operated under the control of the pail blanks for controlling the operation of said clutch so that the clutch is disconnected and the tape feeding and applying mechanism is arrested without affecting the operation of said blank feeding mechanism.

26. In a machine of the class described, the combination of a rotating head, tape feeding means thereon comprising two gripping devices, and means for disabling one gripping device at the time the other is enabled.

27. In a machine of the class described, the combination of a rotating head, tape feeding means thereon comprising two gripping devices each comprising an arm fast on the head and an arm pivoted thereon, and means for moving the pivoted arm of one device out of gripping position and at approximately the same time moving the pivoted arm of the other gripping device into gripping position.

28. In a machine of the class described, the combination of a rotating head, means for giving the head one half of a rotation and then maintaining it in stationary position upon each taping operation, two gripping devices on opposite sides of the head, and means rendering one gripping device effective and the other ineffective while the head is in stationary position.

29. In a machine of the class described, the combination of a movable head, two gripping devices carried thereby, means for holding one device open and the other closed during movement of said head, and means for closing the device which has been open, and opening the other, which has been closed, while the head is in stationary position.

30. In a machine of the class described, the combination of two tape gripping devices for alternately gripping the tape at the severed end, means for severing the tape, means for applying the severed piece of tape to a pail blank, and means for controlling the gripping of the end of the tape by one or the other of the gripping devices after the piece of tape to be severed has been moved into engagement with the blank.

31. In a machine of the class described, the combination of a tape severing device, means for moving the piece of tape to be severed into engagement with the pail blank, a tape gripping device, and means for operating the severing and gripping devices at the same time and after the piece of tape has been moved into engagement with the pail blank so that the end of the tape is gripped at the same time that the piece is severed.

32. In a machine of the class described, the combination of a rotating head, means for giving the head one half of a rotation and then maintaining it in stationary position upon each taping operation, two gripping devices on opposite sides of the head, a severing device associated with each gripping device, and means for operating one of the gripping devices and the corresponding severing device at the same time during alternate taping operations to sever a tape handle and grip the end of the tape.

33. In a machine of the class described, the combination of a rotating head, means for giving the head one half of a rotation and then maintaining it in stationary position upon each taping operation, two gripping devices on opposite sides of the head, a severing device associated with each gripping device and means for operating one of said severing devices to sever the tape handle and at the same time open one gripping device to release the end of the handle and close the other gripping device to grip the end of the tape.

34. In a machine of the class described, the combination of a rotating head, means for giving the head one half of a rotation and then maintaining it in stationary position upon each taping operation, two gripping devices on opposite sides of the head, a severing device associated with each gripping device, means for moving the tape handle into engagement with the pail blank, and means for operating one of said severing devices after the tape handle has been moved into engagement with the blank and at approximately the same time open one gripping device to release the end of the handle and close the other gripping device to grip the end of the tape.

35. In a machine of the class described, the combination of a rotating head, two gripping devices carried thereby, means for giving the head one half of a rotation upon each taping operation of the machine, means for maintaining each gripping device out of gripping position during rotation of said head upon alternate operations of the machine, means for holding the gripping devices out of gripping position after they have passed out of cooperative relation with said maintaining means and the head has completed its one half rotation, and means for disabling said holding means and moving the gripping device which is out of cooperative relation with the holding means, out of gripping position.

36. In a machine of the class described, the combination of a rotating head, two gripping devices carried thereby, means for giving the head one half of a rotation upon each taping operation of the machine, means for maintaining each gripping device out of gripping position during rotation of said head upon alternate operations of the machine, means for holding the gripping devices out of gripping position after they have passed out of cooperative relation with said maintaining means and the head has completed its one half rotation, means for moving the tape between the gripping devices into engagement with the pail blank, and means for disabling said holding means and moving the gripping device which is out of cooperative relation with the holding means, out of gripping position after said portion of the tape has been carried into engagement with the pail blank.

37. In a machine of the class described, the combination of a movable head, a gripping device thereon, having an arm a stationary member having a flange for engaging said arm to retain the device out of gripping position during movement of the head, a lever cooperating with said arm to retain the gripping device temporarily out of gripping position at the end of the movement of said head, and means for operating said lever to effect movement of the gripping device to gripping position.

38. In a machine of the class described, the combination of a rotating head a gripping device having an arm thereon, a severing device on the head, a stationary member having a curved flange for engaging said arm to retain the device out of gripping position during rotation of the head, a lever cooperating with said arm to retain the gripping device temporarily out of gripping position at the end of the rotation of said head, and means for operating said severing device and said lever to sever the tape and to effect movement of the gripping device to gripping position.

39. In a machine of the class described, the combination of a movable head, a gripping device thereon, having an arm a stationary member having a flange for engaging said arm to retain the device out of gripping position during movement of the head, a lever cooperating with said arm to retain the gripping device temporarily out of gripping position at the end of the movement of said head, a severing device on said head, and means for operating said lever to effect movement of the gripping device to gripping position and for operating the severing device at approximate the same time to sever the tape.

40. In a machine of the class described, the combination of a rotating head, means for giving the head one half of a rotation upon each taping operation of the machine, two gripping devices carried thereby, two severing devices carried by the head, a curved flange for maintaining each gripping device out of gripping position during rotation of the head upon alternate operations of the machine, a lever for temporarily holding the gripping devices out of gripping position after they have passed out of cooperative relation with said flange and the head has completed its one half rotation, and means for rocking said lever to disable the same and at approximately the same time operate one of the severing devices.

41. In a machine of the class described, the combination of a rotating head, means for giving the head one half of a rotation upon each taping operation of the machine, two gripping devices carried thereby, two severing devices carried by the head, a curved flange for maintaining each gripping device out of gripping position during rotation of the head upon alternate operations of the machine, a lever for temporarily holding the gripping devices out of gripping position after they have passed out of cooperative relation with said flange and the head has completed its one half rotation, and means for rocking said lever to effect movement of the gripping device in cooperative relation therewith into gripping position, for operating the appropriate severing device and for moving the other gripping device out of gripping position.

42. In a machine of the class described, the combination of a rotating head, means for giving the head one half of a rotation upon each taping operation of the machine, two gripping devices carried thereby, two severing devices carried by the head, a curved flange for maintaining each gripping device out of gripping position during rotation of the head upon alternate operations of the machine, a lever for temporarily holding the gripping devices out of gripping position after they have passed out of cooperative relation with said flange and the head has completed its one half rotation, means for moving the portion of the tape between the gripping devices into engagement with the pail blank, and means for approximately at the same time rocking said lever to effect movement of the gripping device in cooperative relation therewith into gripping position, operating the appropriate severing device and moving the other gripping device out of gripping position.

43. In a machine of the class described, the combination of tape feeding mechanism, tape applying needles, pressure sleeves in which the needles are mounted, and yielding devices carried by the pressure sleeves for engaging the pail blanks, when the needles are operated to maintain the blanks in position.

44. In a machine of the class described, the combination of tape feeding mechanism comprising two gripping devices, tape applying devices, and devices for pressing the tape against the pail blank on one side of each of the gripping devices and yielding engaging the pail blank on the opposite side of each gripping device.

45. In a machine of the class described, the combination of tape feeding mechanism, comprising two gripping devices, tape applying needles, bars carrying said needles, pressure sleeves carried by said bars for pressing the tape against the pail blanks on one side of the gripping devices and yielding pressure members on said sleeves for engaging the pail blanks on the other side of said gripping devices.

46. In a machine of the class described, the combination of a bed plate, a rotating device provided with tape gripping means above the bed plate, means for giving said device one half of a rotation upon each cycle of operation of the machine, and tape applying means above the bed plate for applying the tape to the pail blank.

47. In a machine of the class described, the combination of a bed plate, a rotating device provided with tape gripping means above the bed plate, means for giving the rotating device one half of a rotation in the same direction upon each cycle of operation of the machine and maintaining it stationary while the tape is applied to the pail blank, and tape applying means above the bed plate.

48. In a machine of the class described, the combination of a rotating head, two tape gripping devices thereon, and a stationary member provided with an annular flange for retaining each gripping device out of gripping position during rotation of said head upon alternate operations of the machine.

49. In a machine of the class described, the combination of a rotating head, means for giving the head one half of a rotation upon each operation of the machine, two tape gripping devices on the head, and a stationary member provided with an annular flange for retaining each gripping device out of gripping position during rotation of said head upon alternate operations of the machine.

50. In a machine of the class described, the combination of a rotating head, means for giving the head one half of a rotation upon each operation of the machine, two gripping devices on the head, means for retaining each gripping device out of gripping position during rotation of said head upon alternate operations of the machine, and means for moving each gripping device out of gripping position upon alternate operations of the machine while the head is in stationary position.

51. In a machine of the class described, the combination of tape applying devices, pressure members thereon for firmly holding the blank in position while the tape is being applied, and means for operating the applying devices.

52. In a machine of the class described, the combination of tape applying devices, pressure members, springs between said devices and members, and means for operating the applying devices.

53. In a machine of the class described, the combination of tape applying needles, bars carrying the same, pressure sleeves around the bars, springs between said bars and sleeves, and means for operating the bars.

54. In a machine of the class described, the combination of tape applying needles, bars having shoulders and carrying said needles, sleeves around said bars and having shoulders, and coiled springs compressed between the shoulders on said bars and sleeves.

55. In a machine of the class described, the combination of tape applying needles, bars carrying the same, pressure sleeves around the bars and having slots to accommodate the tape, springs between said bars and sleeves, and means for operating said bars.

56. In a machine of the class described, the combination of tape applying devices, pressure members, springs between the pressure members and devices to permit the members to be pressed against the pail blank and the devices to be projected through the same, means for causing the members and devices to be moved together as a unit during part of their operation, and means for operating said devices.

57. In a machine of the class described, the combination of tape applying needles, bars carrying the same, pressure sleeves around the bars, springs between the bars and sleeves, stops on the bars cooperating with the sleeves, and means for operating the bars.

58. In a machine of the class described, the combination of tape applying devices, pressure members carried by said devices, springs between said members and devices, means for securing the ends of the tape to a pail blank, and means for operating said devices to first lower said members into engagement with said blank, then project the ends of the devices through the blank, next withdraw the ends of the devices, and finally raise the pressure members after the securing means has secured the ends of the tape to the pail blank.

59. In a machine of the class described, the combination of tape applying devices, pressure members carried thereby, glue applying means, means for securing the ends of the tape to the deposited glue, and means for operating said devices to hold the pressure means against the pail blank while the glue is applied, next project the ends of the tape applying devices through the blank and withdraw them and then hold the pressure means against the pail blank while the ends of the tape are secured to the deposited glue.

60. In a machine of the class described, the combination of tape applying needles, bars carrying the same, pressure sleeves around said bars, springs between said bars and sleeves; glue applying fingers, devices for pressing the ends of the tape against the deposited glue, and means for operating said bars to hold the sleeves against the pail blank while said devices press the ends of the tape against the glue spots and finally raise the pressure sleeves out of engagement with the pail blank.

61. In a machine of the class described, the combination of a rotating head, and four pivoted pawls on said head for supporting the tape thereon.

62. In a machine of the class described, the combination of a rotating head, means for giving said head one half of a rotation upon each operation of the machine, and two pairs of pawls pivoted on said head, the tape being supported by each pair of pawls upon alternate operations of the machine.

63. In a machine of the class described, the combination of a rotating head, two pawls pivoted on each side of the head and extending in opposite directions, the tape being supported by the ends of each pair of the pawls extending in the same direction upon alternate operations of the machine, and a spring connecting the two pawls on each side of the head.

64. A tape affixing device for paper box blanks embracing in combination, box-blank feeding and positioning means, a rotatable tape feeding head arranged to intermittently position appropriate lengths of tape for attachment to the blank, movable punches, arranged to penetrate the blank and carry predetermined portions of the tape through the blank, and means for severing the tape adjacent to one of said punches, substantially as described.

65. A tape affixing device for paper box blanks embracing in combination, box-blank supporting means, an intermittently revolving tape carrying and measuring device for feeding successive lengths of tape into position for application to the box blank, means for applying the successive lengths of tape to successive box blanks, and means for severing the tape at a predetermined point, substantially as described.

EDWIN J. NEWTON.
CLAUDE SIMMONS.